(12) United States Patent
Vetter et al.

(10) Patent No.: US 9,380,562 B1
(45) Date of Patent: Jun. 28, 2016

(54) SYSTEM, METHOD AND COMPUTER PROGRAM PRODUCT FOR PROVIDING NOTIFICATIONS FROM A VIRTUAL DEVICE TO A DISCONNECTED PHYSICAL DEVICE

(71) Applicant: Hypori, Inc., Austin, TX (US)

(72) Inventors: Brian J. Vetter, Austin, TX (US); Justin P. Marston, Austin, TX (US)

(73) Assignee: Hypori, Inc., Austin, TX (US)

( * ) Notice: Subject to any disclaimer, the term of this patent is extended or adjusted under 35 U.S.C. 154(b) by 328 days.

(21) Appl. No.: 14/160,877

(22) Filed: Jan. 22, 2014

Related U.S. Application Data

(60) Provisional application No. 61/755,205, filed on Jan. 22, 2013.

(51) Int. Cl.
*H04W 68/12* (2009.01)

(52) U.S. Cl.
CPC ..................................... *H04W 68/12* (2013.01)

(58) Field of Classification Search
CPC .................................................... H04W 68/12
USPC ............................... 455/412.2, 414, 408, 466
See application file for complete search history.

(56) References Cited

U.S. PATENT DOCUMENTS

| | | | |
|---|---|---|---|
| 6,845,238 B1 | 1/2005 | Muller | |
| 7,190,356 B2 | 3/2007 | Lin | |
| 7,400,328 B1 | 7/2008 | Ye et al. | |
| 7,768,959 B1 | 8/2010 | Chen | |
| 7,809,667 B1 | 10/2010 | Yehuda et al. | |
| 7,827,228 B2 * | 11/2010 | Emberton | G06Q 10/10 705/34 |
| 9,060,239 B1 | 6/2015 | Sinha et al. | |
| 9,245,241 B2 | 1/2016 | Kite | |
| 2003/0182383 A1 * | 9/2003 | He | G06Q 10/107 709/206 |
| 2005/0088992 A1 | 4/2005 | Bolin | |
| 2006/0203916 A1 | 9/2006 | Chandramouly et al. | |
| 2006/0288306 A1 | 12/2006 | Mahajan et al. | |
| 2007/0117561 A1 | 5/2007 | Shu | |
| 2008/0225010 A1 | 9/2008 | Wang | |
| 2009/0023426 A1 | 1/2009 | Shatzkamer | |
| 2009/0170472 A1 | 7/2009 | Chapin | |
| 2009/0207140 A1 | 8/2009 | Hansson | |

(Continued)

OTHER PUBLICATIONS

Office Action for U.S. Appl. No. 14/062,343, mailed May 26, 2015, 16 pgs.

(Continued)

*Primary Examiner* — Michael T Vu
(74) *Attorney, Agent, or Firm* — Sprinkle IP Law Group

(57) ABSTRACT

Systems, methods and computer program products for providing notifications to physical devices when they are disconnected from corresponding virtual devices. In one embodiment, a system includes a host server executing a virtual device, and a notification server. A notification manager on the virtual device receives notifications and forwards them to the notification server when the physical device is not connected to the virtual device. The notification server stores the notifications and also stores a set of filters. The notification server identifies user, group and location information from a token of the physical device, retrieves notifications for the user and selects filters based on the information from the token. The notification server applies the filters to the notifications to produce sanitized notification information, and forwards this sanitized notification information to the physical device.

20 Claims, 13 Drawing Sheets

(56) References Cited

U.S. PATENT DOCUMENTS

| | | |
|---|---|---|
| 2010/0069035 A1 | 3/2010 | Johnson |
| 2010/0100725 A1* | 4/2010 | Ozzie ................. G06F 21/43 713/155 |
| 2010/0103837 A1 | 4/2010 | Jungck |
| 2010/0115020 A1 | 5/2010 | Hochmuth et al. |
| 2010/0173605 A1* | 7/2010 | Moraes ................. H04L 12/587 455/408 |
| 2010/0189887 A1 | 7/2010 | Nielson |
| 2010/0238837 A1 | 9/2010 | Zheng |
| 2010/0306249 A1 | 12/2010 | Hill |
| 2010/0306771 A1 | 12/2010 | Kamay et al. |
| 2011/0102299 A1 | 5/2011 | Hochmuth et al. |
| 2011/0130951 A1 | 6/2011 | Lee |
| 2011/0176528 A1 | 7/2011 | Lu |
| 2011/0210972 A1 | 9/2011 | Tsirkin et al. |
| 2011/0213828 A1 | 9/2011 | Tsirkin et al. |
| 2011/0223918 A1 | 9/2011 | Dahlen |
| 2011/0270600 A1 | 11/2011 | Bose |
| 2011/0271200 A1 | 11/2011 | Kikkawa et al. |
| 2012/0064908 A1 | 3/2012 | Fox et al. |
| 2012/0066304 A1 | 3/2012 | Marmon et al. |
| 2012/0130042 A1 | 5/2012 | Brunelle et al. |
| 2012/0182970 A1 | 7/2012 | Ding |
| 2012/0191657 A1 | 7/2012 | Weinstein et al. |
| 2012/0296963 A1 | 11/2012 | Lu |
| 2012/0310894 A1 | 12/2012 | Freedman et al. |
| 2012/0323690 A1 | 12/2012 | Michael |
| 2013/0024778 A1 | 1/2013 | Reeves et al. |
| 2013/0031482 A1 | 1/2013 | Saul |
| 2013/0078994 A1 | 3/2013 | Jouin |
| 2013/0083960 A1 | 4/2013 | Kostrzewski et al. |
| 2013/0086202 A1 | 4/2013 | Connelly |
| 2013/0173556 A1 | 7/2013 | Grigg et al. |
| 2013/0188608 A1 | 7/2013 | Balachandran |
| 2013/0265450 A1 | 10/2013 | Barnes, Jr. |
| 2013/0275766 A1 | 10/2013 | Plainecassagne et al. |
| 2013/0283038 A1 | 10/2013 | Kulkarni et al. |
| 2013/0326072 A1 | 12/2013 | Smyth |
| 2013/0339185 A1 | 12/2013 | Johnson |
| 2013/0339498 A1 | 12/2013 | Johnson |
| 2014/0059160 A1 | 2/2014 | Chernoff |
| 2014/0071895 A1 | 3/2014 | Bane et al. |
| 2014/0108084 A1 | 4/2014 | Bargetzi |
| 2014/0108940 A1 | 4/2014 | Diercks |
| 2014/0111528 A1 | 4/2014 | Lifshitz et al. |
| 2014/0358670 A1 | 12/2014 | Lefevre |
| 2015/0050915 A1 | 2/2015 | Formo |
| 2015/0082456 A1 | 3/2015 | Eren et al. |
| 2015/0089395 A1 | 3/2015 | Beel et al. |
| 2015/0091947 A1 | 4/2015 | Rakow et al. |
| 2015/0222604 A1 | 8/2015 | Ylonen |

OTHER PUBLICATIONS

Office Action for U.S. Appl. No. 14/160,794, mailed Sep. 1, 2015, 12 pgs.

Office Action for U.S. Appl. No. 14/161,083, mailed Feb. 3, 2016, 27 pgs.

Office Action for U.S. Appl. No. 14/161,157, mailed Feb. 22, 2016, 15 pgs.

Notice of Allowance for U.S. Appl. No. 14/160,904, mailed Mar. 8, 2016, 6 pgs.

Office Action for U.S. Appl. No. 14/160,794, mailed Mar. 9, 2016, 11 pgs.

Office Action for U.S. Appl. No. 14/160,946, mailed Mar. 9, 2016, 20 pgs.

Notice of Allowance for U.S. Appl. No. 14/161,069, mailed Mar. 14, 2016, 7 pgs.

Notice of Allowance for U.S. Appl. No. 14/161,069, mailed May 6, 2016, 5 pgs.

* cited by examiner

LOCATIONS

| | 38.8896, -77.0496 ± 200m | 30.3835, -97.7434 ± 250m | 40.6895, 74.04478 ± 100m | 43.879, -103.459 ± 360m | ALL |
|---|---|---|---|---|---|
| USER=JOHN DOE | A | | | | |
| USER=JOE SMITH | | | | | A |
| USER=JANE JONES | A | | B | B | |
| GROUP=CONTRACTOR | | | | C | |
| GROUP=ADMINS | | | B | | A |
| GROUP=ANALYSTS | A | | | B | |
| GROUP=FTE | A | | | B | |
| GROUP=OTHER | | D | | | |

FIG. 11

FILTER TYPE

| | TITLE | TEXT | SUBTEXT | WHEN | SOUND | NUMBER | PRIORITY | VIBRATE | WHAT |
|---|---|---|---|---|---|---|---|---|---|
| A | X | X | X | X | X | X | X | X | X |
| B | X | | | X | X | X | X | X | X |
| C | | | | X | X | X | | | X |
| D | | | | X | | | | X | |

"X" MEANS TO INCLUDE THAT TYPE OF INFORMATION IN NOTIFICATION SENT TO THE CLIENT

FIG. 12

SYSTEM, METHOD AND COMPUTER PROGRAM PRODUCT FOR PROVIDING NOTIFICATIONS FROM A VIRTUAL DEVICE TO A DISCONNECTED PHYSICAL DEVICE

CROSS-REFERENCE TO RELATED APPLICATION(S)

This application is a conversion of and claims a benefit of priority from U.S. Provisional Application No. 61/755,205, filed Jan. 22, 2013, entitled "VIRTUAL MOBILE DEVICE PLATFORM." This application relates to U.S. patent application Ser. No. 14/160,794, filed Jan. 22, 2014, entitled "SYSTEM, METHOD AND COMPUTER PROGRAM PRODUCT FOR CAPTURING TOUCH EVENTS FOR A VIRTUAL MOBILE DEVICE PLATFORM"; Ser. No. 14/160,904, filed Jan. 22, 2014, entitled "SYSTEM, METHOD AND COMPUTER PROGRAM PRODUCT FOR CONNECTING ROAMING MOBILE DEVICES TO A VIRTUAL DEVICE PLATFORM"; Ser. No. 14/160,946, filed Jan. 22, 2014, entitled "SYSTEM, METHOD AND COMPUTER PROGRAM PRODUCT PROVIDING BYPASS MECHANISMS FOR A VIRTUAL MOBILE DEVICE PLATFORM"; Ser. No. 14/161,069, filed Jan. 22, 2014, entitled "SYSTEM, METHOD AND COMPUTER PROGRAM PRODUCT FOR DYNAMICALLY SWITCHING OPERATING SYSTEMS IN A VIRTUAL MOBILE DEVICE PLATFORM"; Ser. No. 14/161,083, filed Jan. 22, 2014, entitled "SYSTEM, METHOD AND COMPUTER PROGRAM PRODUCT FOR USER PERFORMANCE AND DEVICE RESOLUTION SETTINGS"; and Ser. No. 14/161,157, filed Jan. 22, 2014, entitled "SYSTEM, METHOD AND COMPUTER PROGRAM PRODUCT FOR GENERATING REMOTE VIEWS IN A VIRTUAL MOBILE DEVICE PLATFORM." All applications listed in this paragraph are incorporated by reference as if set forth herein in their entireties.

TECHNICAL FIELD

This disclosure relates generally to a virtual mobile device platform for touch-enabled mobile devices. More particularly, embodiments disclosed herein relate to a system, method, and computer program product for providing notifications from virtual devices to users of corresponding physical devices when the physical devices are disconnected from the virtual devices.

BACKGROUND OF THE RELATED ART

Today's mobile devices such as smart phones and tablets face unique security issues, some of which go hand in hand with mobility. Enterprises, military, and intelligence agencies (collectively referred to herein as "organizations") are all grappling with their users' use of mobile devices as many users are carrying out both business as well as personal activities on their mobile devices. This can be problematic even if a Bring Your Own Device ("BYOD") device policy is in place.

BYOD can raise serious security issues when a user's personal device is used to access both non-sensitive and sensitive (and sometimes risky) networks and/or services. For example, if an employee uses his personal smartphone to access a company network and then loses that phone, untrusted parties could retrieve any unsecured data on the phone. Another type of security breach occurs when an employee leaves a company, she does not have to give the company back her personal device, so company-owned applications and other data may still be present on her personal device. A challenging but important task for organizations that utilize BYOD is to develop a policy that defines exactly what sensitive company information needs to be protected and which employees should have access to this information, and then to educate all employees on this policy. Commercial carriers are normally relied upon for implementing the security requirements of an organization's BYOD policy.

Because of Internet-based risks, some very risk-averse organizations issue devices specifically for Internet use (this is termed "Inverse-BYOD"), providing unfiltered access to the Internet and reserving filtered, sensitive network data for use within a secured, private network. However, this means that a user likely has to carry multiple devices (including one for his personal use) and organizations do not have a sure way of preventing the user from using his personal mobile device to communicate non-sensitive but company-related information. As such, organizations continue to search for solutions that allow mobile services to be delivered or shared within a single device, rather than having to issue their users multiple devices or separate devices for their personal use and locking them into private networks.

Finding viable solutions to handle mobile devices can be particularly challenging for organizations that operate in high assurance computing environments. A high assurance computing environment is one that provides a certain level of assurance as to its behavior, useful in ensuring a level of secrecy for classified information. For instance, a high assurance operating system may permit only certain certified applications to access a particular portion of a memory on a device where sensitive information is stored. However, this does not prevent the physical device itself to become suspect—how it was built, who has handled it from manufacturing through use, how it is used by the user, etc. Moreover, the device could be physically accessed or otherwise compromised in many ways. For instance, information stored or cached on a mobile device could be accessed while its owner is away (e.g., left on the table at a restaurant or on their desk at work, stolen, or lost) or the user may have downloaded an infected application or could be sent an infected document via email or instant messaging, or accessed an infected service.

Because a mobile device lives in a hostile world, securing the physical device itself (e.g., via Tempest hardware, encrypted storage, biometrics, etc.) is not enough and can be very expensive to do a thorough job. Even so, infiltration from any portion of the stack—from the chips to the software that is installed to the data the device receives—still leaves the device vulnerable to attacks from well-funded, motivated, adversaries. Attempts to provide the level of separation needed within the actual device face many challenges, and at best are likely to become a very expensive niche proposition in the overall commercial mobility ecosystem.

In view of unique challenges in incorporating mobile devices such as smart phones and tablets into secure computing environments, there is room for innovations and improvements. One area in need of improvement relates to the notifications that are provided by mobile devices. When a person is actively using a mobile device, the device may provide notifications of various events that may be of interest to the user. These notifications may include sounds that are made by the device or icons that are displayed by the device to indicate the type of event that has occurred. The most obvious notifications are the ones that are presented to the user of a smart phone when a telephone call is received. These notifications include turning on the display (which may include selected images and the caller's phone number), playing a selected ring tone, and/or causing the device to vibrate. Similarly, a device may present predetermined images or sounds to indicate that emails, text messages or other notifications have been received. Still other types of notifications may be provided by different applications that are executable by the device. Commonly, these notifications are configurable by the user.

Typically, a mobile device has a notification manager that executes on the device and manages the notifications. The various applications on the device which may need to have notifications communicated to the user are registered with the notification manager when they are installed. Then, when it is necessary for an application to notify the user of an event, the application communicates the desired information to the notification manager, which then provides a notification to the user (e.g., via displays or sounds). This mechanism works well when the notification manager is executing on a physical device, breaks down when it is executing on a virtual device that is disconnected from the physical device.

Although a notification manager executing on a virtual device could perform the same functions in the same manner as the notification manager on a physical device, the notifications cannot be directly communicated to the physical device when the physical device is disconnected from the virtual device. Further, because the virtual device has been implemented in order to maintain the security of a private network, it may not even be desirable to communicate notifications in the same manner as when the notification manager is executing on the physical device, because the notification itself may allow private information to escape the private network.

It would therefore be desirable to provide systems and methods for providing notifications to users when the users have mobile devices that can be alternately connected to or disconnected from virtualized devices in a private, secure network, where applications (and notification managers) are executed on the virtualized devices rather than the physical devices.

SUMMARY OF THE DISCLOSURE

One embodiment comprises a system for providing notifications from virtual devices to users of corresponding physical devices. The system includes a host server and a notification event server. The host server executes a virtual device which corresponds to a physical device of a user. The virtual device executes a notification manager that receives notifications from one or more notification sources. When the physical device is not connected to the virtual device and cannot receive notifications directly from the notification manager, the notification manager forwards the notifications to the notification event server. The notification event server receives the notifications and stores the notifications in an event store. The notification event server also maintains a filter store in which a set of filters are stored.

The notification event server periodically receives an authorization token from the user's physical device (which is disconnected from the virtual device). When the authorization token is received, the notification event server examines the token to find information that identifies, for example, the user, a group associated with the user, and a location of the physical device. Based on the identification of the user and/or group, the notification event server identifies notifications in the event store that are associated with the user. These notifications are retrieved by the server from the event store. The notification event server also determines, based on the information identified in the authorization token, which of the filters in the filter store are applicable to the notifications. This determination may be based on an identifier of the user or group, an indication of the location of the physical device, the type of notifications that have been retrieved for the user, or other relevant information. The selected filters are then retrieved from the filter store and are applied to the retrieved notifications to produce filtered notification information. The filtered notification information excludes sensitive information as determined by the selected filters. The notification event server then provides the filtered notification information to the physical device.

An alternative embodiment may comprise a method for communicating notification information to a physical device which is disconnected from a corresponding virtual device that is executing on a private network. The method may include receiving notifications from one or more notification sources in a notification manager executing on the virtual device. If the physical device were connected to the virtual device, the notification manager would forward the notifications directly to the physical device. When physical device is disconnected from the virtual device, however, this is not possible, so the notification manager forwards the notifications to a notification event server. The notification event server stores the notifications in an event store.

From time to time, the user's physical device communicates an authorization token to the notification event server. The notification event server identifies information in the token that indicates, for example, the user, a group associated with the user, and a location of the physical device. The notification event server uses this information to identify notifications in the event store that are associated with the user, and then retrieves these notifications. The notification event server also uses the information identified in the authorization token to determine which of a set of filters are required to filter the retrieved notifications. The selected filters are retrieved from a filter store where they are maintained. The selected filters are then applied to the retrieved notifications to produce filtered notification information, which excludes sensitive information. The filtered notification information is then provided to the physical device.

Still another embodiment may comprise a computer program product that embodies a method such as is described above. The computer program product comprises a tangible, computer-readable medium that stores instructions which are executable by a computer. When the computer executes the instructions, the computer executes the described method.

In one embodiment, the host server on which the virtual device executes and the notification server are contained within a private network. Application of the selected filters to the retrieved notifications in the notification event server prevents one or more defined types of sensitive information from being communicated out of the private network in the notification information that is provided to the physical device. The specific structures of the notification event server, filter store, event store, filter selection data structures, etc. may vary from one embodiment to another. Likewise, the specific steps of method embodiments may vary from the specific steps of the exemplary embodiments described herein.

In some embodiments of the invention, when the physical device is connected to the virtual device executing on the host server, the notification manager bypasses the notification server and forwards the notifications directly to the physical device. The notifications may be generated by applications that are executing on the virtual device, or they may originate from sources external to the virtual device. In some embodiments, the host server may execute multiple virtual devices, some of which are connected to the corresponding physical devices, and some of which are disconnected from the corresponding physical devices. The system may use the notification event server to filter and thereby sanitize notification information provided to the disconnected physical devices while notifications are forwarded directly to the connected physical devices.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 11 depicts a table showing which filters are used in one embodiment, depending upon the user ID, group and location associated with a client device.

FIG. 12 depicts a table showing the data items that are allowed and/or filtered out of notifications for each of a set of filter types in one embodiment.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As described above, a mobile device lives in a hostile world and, as such, securing the device itself may not be enough and/or possible. There is a desire to separate a physical device from applications that run on the device. Embodiments disclosed herein can remove the applications and services, even much of the device's operating environment from the hostile environment. Instead, these functions are provided on protected hardware and software in a data center where they can be managed, monitored, repaired, and deployed under the care of information technology (IT) experts and administrators.

Figure 1:
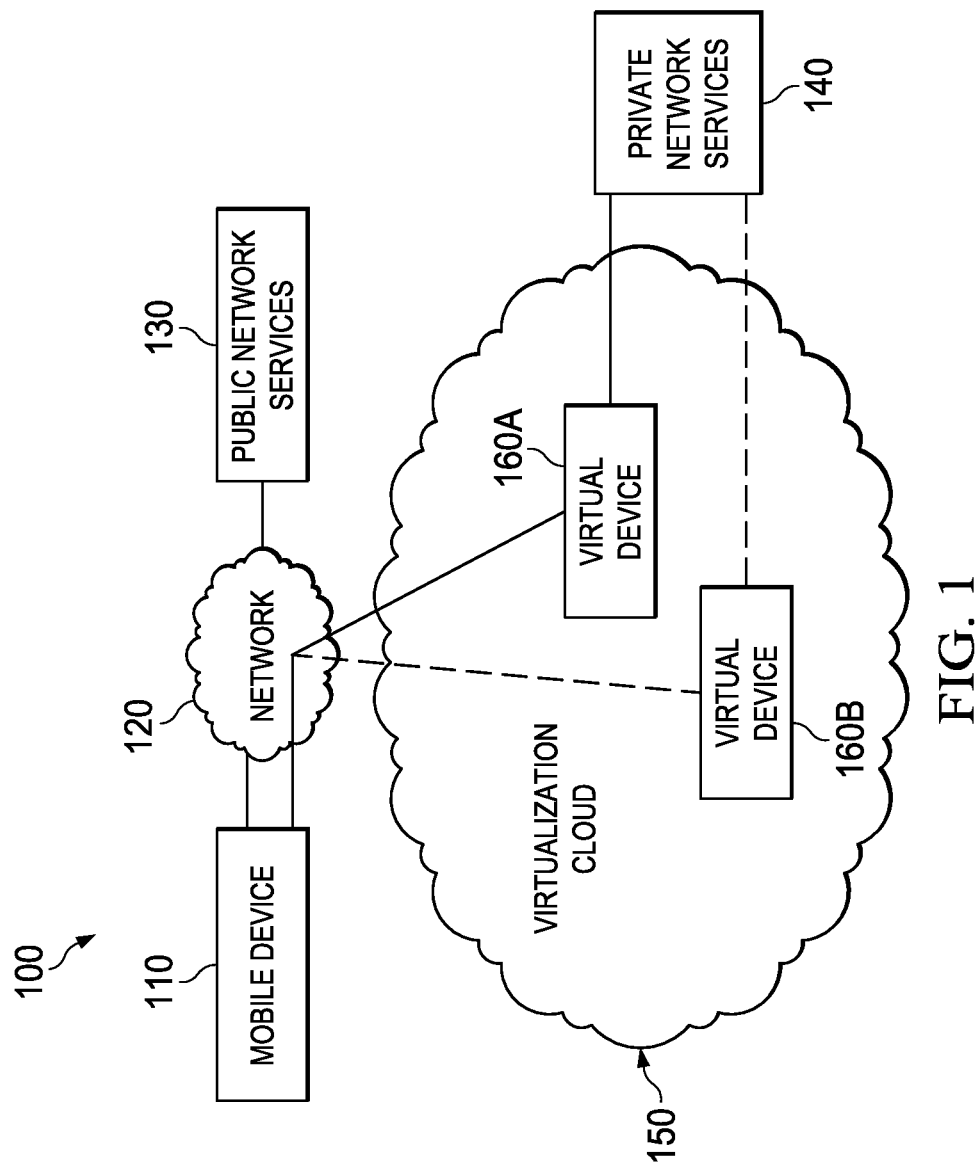
FIG. 1 depicts a diagrammatic representation of an example of an overall network environment in which embodiments disclosed herein may be implemented.

As illustrated in FIG. 1, embodiments disclosed herein can allow a user of mobile device 110 in network environment 100 to switch between using public network services 130 and using private network services 140. In particular, the user may access public network services 130 via public network 120 such as the Internet over which non-sensitive information may be communicated. However, to access private network services 140, a virtualization cloud client application (referred to hereinafter as a "VC client application") running on mobile device 110 connects to a virtualized device (e.g., virtual device 160A) hosted in virtualization cloud 150 and brokers access to private network services 140 as well as local device functions.

Those skilled in the art will appreciate that local device functions may vary depending upon the type of mobile device 110. For example, mobile device 110 can be a touchscreen smartphone with local device functions such as the touch screen, the dialer/phone network, camera, Global Positioning System (GPS), keyboard, speakers, microphone, and so on. Other examples of mobile device 110 may include touchscreen tablets and other touch-enabled mobile devices. As will be explained in further detail below, such mobile device functions can be provided by embodiments disclosed herein on protected hardware and software in virtualization cloud 150 without adversely affecting the user's experience in interacting with mobile device 110, even if the user travels frequently from one continent to another.

In some embodiments, multiple virtualized devices may be created for the same physical device. For example, in FIG. 1, virtual device 160A and virtual device 160B may be created for mobile device 110. This feature is further described below with reference to FIG. 2.

Figure 2:
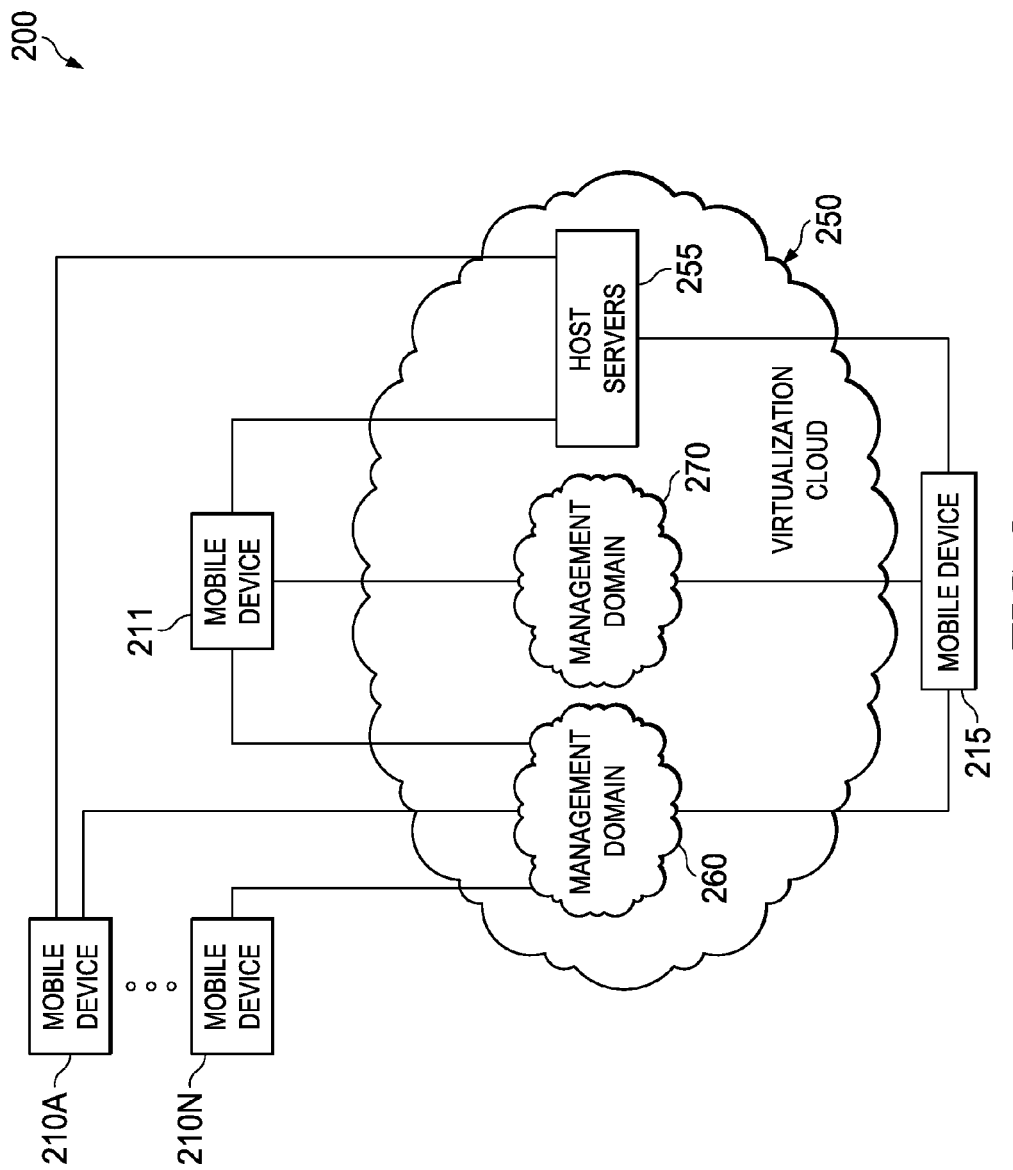
FIG. 2 depicts a diagrammatic representation of an example of a network architecture according to one embodiment.

FIG. 2 depicts a diagrammatic representation of an example of a network architecture according to one embodiment. In this example, system 200 may include virtualization cloud 250 communicatively connected to various types of mobile devices 210A ... 210N, 211, and 215. Mobile devices 210A ... 210N, 211, and 215 may represent different types of actual touchscreen devices such as smartphones and tablets. Mobile devices 210A ... 210N, 211, and 215 may be owned by the same or different entities (e.g., enterprises, users, etc.). Further, mobile devices 210A ... 210N, 211, and 215 may be programmed with different operating systems such as iOS, Android, and Windows.

Each of mobile devices 210A ... 210N, 211, and 215 may have a VC client application installed, for instance, by an administrator or IT personnel of system 200. In one embodiment, a VC client application may be downloaded from an online device-specific app store.

In one embodiment, a VC client application may comprise software that brokers access to mobile devices' physical interfaces (e.g., soft and hard keyboards, touchscreen, GPS, camera, accelerometer, speakers, microphone, phone dialer, etc.) and Virtual Private Network (VPN) software that connects across a public network such as the Internet to servers in a virtualization cloud (e.g., virtualization cloud 150 of FIG. 1) over encrypted network interfaces. Virtualization cloud 250 may be an embodiment of virtualization cloud 150 described above with reference to FIG. 1.

Virtualization cloud 250 provides a hosted, networked, application environment. As a non-limiting example, in one embodiment, virtualization cloud 250 is configured as an Android application environment. As illustrated in FIG. 2, virtualization cloud 250 may comprise host servers 255 and management domains 260, 270.

Host servers 255 may host application services. Private network services 140 of FIG. 1 may be an embodiment of application services hosted by host servers 255 of FIG. 2. In one embodiment, a plurality of application services may execute on a collection of servers with extensions to support separation and segmentation of a core server.

Each management domain may comprise a collection of virtualized devices, hosted on one or more server machines. In an Android application environment, such virtualized devices may be referred to as virtual Android devices. From another perspective, a management domain is made up of a collection of server machines providing services to a large number of users. A collection of server machines may host virtual devices for these users and provide access to the applications and services via a remote client interface. In some embodiments, a management domain may further comprise a private application "store" for hosting installable approved enterprise applications particular to that management domain. In some embodiments, a user can have access to one or more "virtual devices" hosted in the management domain, each virtual device containing a core set of applications such as an enterprise address book, mail, calendar, web browser, etc. in addition to any preinstalled enterprise applications.

As FIG. 2 exemplifies, each mobile device (e.g., mobile device 210A, mobile device 211, mobile device 215, etc.) has a connection (via a VC client application installed thereon) to one or more server machines that host their virtual device(s) in a virtualization cloud (e.g., virtualization cloud 250). As explained below, the applications and their data located within a single virtual device are completely inaccessible to the applications and data in another virtual device. The applications are limited to the network services within their management domain and thus cannot access the network services provided in other management domains. For example, mobile device 210A may have a first virtual device hosted on a first server machine in management domain 260 and a second virtual device hosted on a second server machine in management domain 270. However, the applications and their data located within the first virtual device in management domain 260 are completely inaccessible to the applications and data within the second virtual device in management domain 270.

In some embodiments, for each connection to an application service hosted in the virtualization cloud, a different instance of the VC client application is started on the mobile device. For example, a first VC client instance may be started on mobile device 210A to access management domain 260 and a second VC client instance may be started on mobile device 210A to access management domain 270. All of the applications running in a particular management domain for a particular user will be accessed through the corresponding VC client application running on the mobile device. Additionally, the VC client application's remote connection software running in a mobile device does not expose application generated events running natively within the mobile device to the applications running in their virtual device(s), unless they are specific events from the devices brokered by the VC client application. In this way, rather than executing mobile applications in an actual device (e.g., mobile device 210A, etc.), the applications are run remotely in a virtualization cloud (e.g., virtualization cloud 250) under the watchful eyes of an enterprise's systems and network management tools and their administrators, separate from each other and from the consumer/Internet applications and data.

Figure 3:
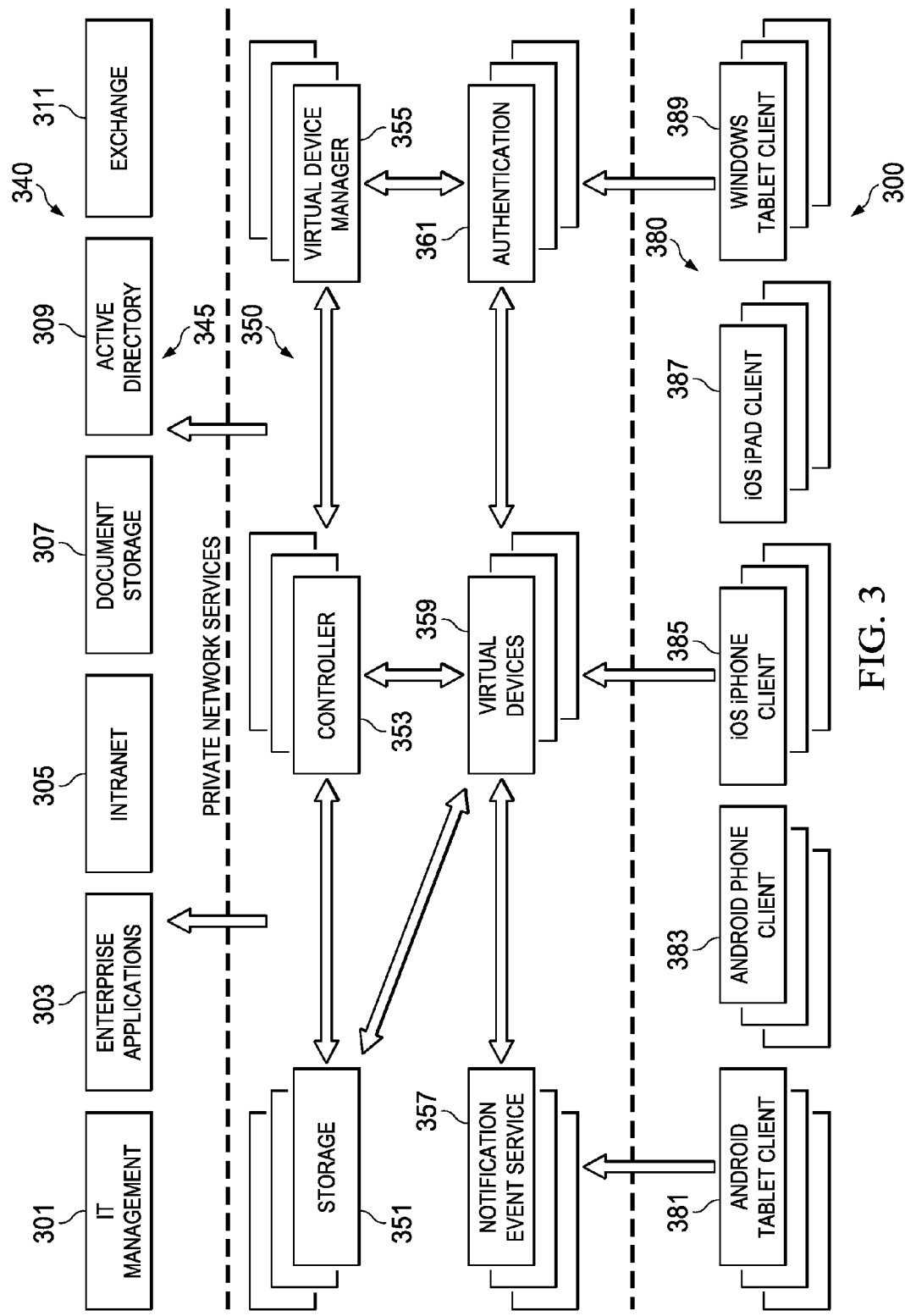
FIG. 3 depicts a diagrammatic representation of an example of a system architecture according to one embodiment.

Turning now to FIG. 3, which depicts a diagrammatic representation of an example of a system architecture according to one embodiment. In this example, system 300 comprises virtualization cloud 350 communicatively connected to private network services 340 and various types of mobile devices 380.

Mobile devices 380 may operate in a distributed computing environment and may operate on various types of operating systems. Similar to mobile devices 110, 210A ... 210N, 211, 215 described above, each of mobile devices 380 may have a VC client application installed thereon. The installed VC client application may be device-specific. For example, each of Android tablets 381 may have an Android tablet client, each of Android phones 383 may have an Android phone client, each of iOS iPhones 385 may have an iOS iPhone client, each of iOS iPads 387 may have an iOS iPad client, and each of Windows tablets 389 may have a Windows tablet client.

Private network services 340 may comprise enterprise services for private network 345. Non-limiting examples of private network services 340 may include IT management 301, enterprise applications 303, intranet 305, document storage 307, active directory 309, and email exchange 311. These services are known to those skilled in the art and thus are not further described herein.

Virtualization cloud 350 may comprise a plurality of system components, including storage 351, controller 353, virtual device manager 355, notification event service 357, virtual devices 359, and authentication 361. These system components may run on a single server machine or separately on multiple server machines. For the sake of convenience, and not of limitation, FIG. 3 shows each system component running on multiple physical servers.

More specifically, virtual device manager 355 (an application that manages virtual devices) may send a command to controller 353 to create a virtual device. In one embodiment, controller 353 may implement the OpenStack open source cloud computing fabric controller. OpenStack is known to those skilled in the art and thus is not further described herein for the sake of brevity.

In response to the command from virtual device manager 355, controller 353 may first select a golden image, and any applications associated with the golden image. A golden image refers to a virtual machine that was built as a template and that usually contains little, if any, more than the base operating system. A golden image may also be referred to as a gold image, clone image, master image or base image. To create a golden image, an administrator first sets up the computing environment exactly the way it is needed and then saves the disk image as a pattern for making more copies. The use of golden images can save time and ensure consistency by eliminating the need for repetitive configuration changes and performance tweaks. This approach can be compared to automated replication, which requires a configuration management tool to build new images on demand. In a self-service provisioning environment, a collection of golden images may be referred to as a golden repository, gold catalog or golden image library.

Using the selected golden image, controller 353 may create virtual device instance 359 and associate with it a storage location in storage server 351. Storage server 351 holds the persisted, physical storage of each virtual device created by controller 353. Controller 353 may then return the information on virtual device instance 359 to virtual device manager 355.

In some embodiments, each user is assigned one or more virtual devices in one or more management domains when they are provisioned. These virtual "devices" contain applications, their settings and device configuration, as well as any data created locally in the device for the user by any installed applications. The images are maintained in network storage servers (e.g., storage servers 351) within the corresponding management domain(s). In some embodiments, as part of this image, the user is provided an emulated "flash" drive for app storage. The images can also be configured to permit access to external enterprise storage. In some embodiments, storage servers may utilize redundant storage to protect data from failures.

In some embodiments, authentication servers 361 may be configured to provide authentication and session management services. For example, when a user (via a VC client application running on a mobile device that the user is using) attempts to access an enterprise application, authentication server 361 may connect to one or more directory servers (e.g., active directory 309) to authenticate the user's access to virtual device(s) where the enterprise application can be run and to provision the user with one or more virtual devices. After the user authenticates, authentication server 361 may direct virtual device manager 355 to locate a device server that will host the user's virtual device 359. In some embodiments, it may ensure that virtual device 359 is "powered on" as well as initiate the initial session negotiation (via establishment of security tokens) between the mobile device running the VC client application and virtual device 359.

Those skilled in the art will appreciate that a virtual "device" is a not really a device—it is a remote execution environment for all of the services and applications that make up a device. There are (at least) two main classes of device servers, "bare metal" device servers and virtual machine device servers. There are some functional, deployment, and cost differences between these types and so ultimately implementation and market demand will determine their allocation and availability.

The bare metal device servers are made up of a large number of relatively small processing units similar in performance and scale to the processing units of actual mobile devices. Each virtual device instance can run on its own physical central processing unit ("CPU") hardware. In some embodiments, a modified version of the Simple Protocol for Independent Computing Environments (SPICE) protocol server software executes directly in the operating system (OS) on each of these instances to provide remote access.

SPICE is an open source protocol and implementation developed by Red Hat that provides remote access to virtual desktops. SPICE has a well-documented protocol that includes the ability to create new "channels" for different remote services. Embodiments extend the SPICE protocol to provide remote access to virtual devices and to broker access to the sensors of the real (physical) devices.

Virtual machine device servers are server class machines that can be found in the server market today. On the virtual machine device servers, each virtual "device" executes in its own virtual machine on a specially configured Linux device server. In some embodiments, a device server may be configured to provide Transport Layer Security (TLS) and VPN encryption, virtual device instrumentation/auditing, integrity checks and anti-virus from virtualization layer, system-side application management, learning of 'normal' behavior, protocol aware firewall, server-side TPM attestation, SELinux-based virtual device separation, VPN service for applications in the virtual devices, and network proxy for traffic monitoring. Some of these features are further explained below.

In some embodiments, virtual devices hosting Android (or Security Enhancements for Android (SEAndroid)) may be created for each user using Linux's Kernel-based Virtual Machine (KVM) and Quick EMUlator (QEMU).

KVM refers to a kernel-resident virtual machine infrastructure built directly into Linux as opposed to other virtualization techniques that run under Linux as a process. This architecture helps KVM operate very efficiently within Linux. KVM provides completely separate virtual environments for Android devices implementing embodiments disclosed herein. KVM itself does not provide any hardware emulation or remoting capabilities.

QEMU is a user-space emulator that works with KVM to provide the hardware emulation. While QEMU can provide processor instruction emulation, embodiments employ it only for emulating hardware for the virtual device. For example, some embodiments use or provide emulated hardware for touch screen/display, memory/storage, audio, cameras, sensors, bypass, and networking.

Linux and KVM provide the isolation between each user and the applications that they run. It is not possible to communicate directly between the application components and services in these separate virtual containers. Thus, each "device", while sharing physical server hardware, runs independently and is separate from the others, as depicted in FIG. 4.

Figure 4:
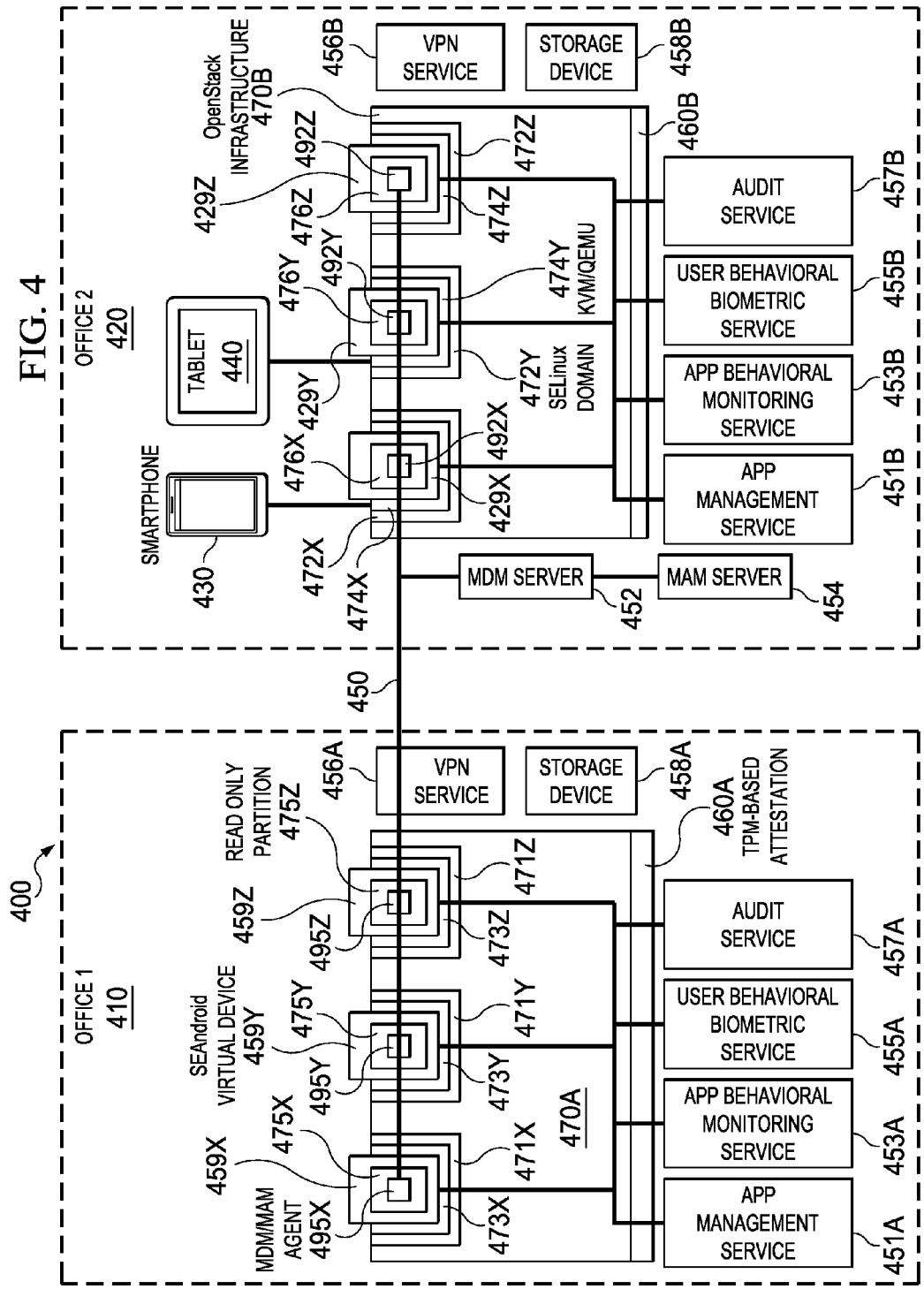
FIG. 4 depicts a diagrammatic representation of an example of virtual device containment and connections according to one embodiment.

FIG. 4 depicts a diagrammatic representation of an example of virtual device containment and connections according to one embodiment. In this example, virtualization cloud 400 may comprise management domain 410 (Office 1) and management domain 420 (Office 2).

Management domain 410 and management domain 420 may be hosted on device servers connected to management network 450 which provides a plurality of network services such as application management services 451A, 451B, application behavioral monitoring services 453A, 453B, user behavioral biometric services 455A, 455B, and audit services 457A, 457B.

Management domain 410 may comprise a plurality of virtual devices 459X, 459Y, 459Z implemented using Open-Stack infrastructure 470A on Trusted Platform Module (TPM)-based attestation 460A. Each of the plurality of virtual devices 459X, 459Y, 459Z may include an agent of management network 450 (e.g., agents 495X, 495Y, 495Z, respectively). In some embodiments, the agent may be referred to as a mobile device management and mobile application management (MDM/MAM) agent. In this example, management domain 410 may further comprise VPN service 456A and storage service 458A.

Management domain 420 may comprise a plurality of virtual devices 429X, 429Y, 429Z implemented using OpenStack infrastructure 470B on TPM-based attestation 460B. Each of the plurality of virtual devices 429X, 429Y, 429Z may include an agent of management network 450 (e.g., agents 492X, 492Y, 492Z, respectively). In this example, management domain 420 may further comprise MDM server 452, MAM server 454, VPN service 456B, and storage service 458B.

As illustrated in FIG. 4, each of the plurality of virtual devices 459X, 459Y, 459Z in management domain 410 and each of the plurality of virtual devices 429X, 429Y, 429Z in management domain 420 has a read only partition and its own KVM/QEMU in a particular SELinux domain (e.g., read only partition 475X and KVM/QEMU 473X in SELinux domain 471X, read only partition 475Y and KVM/QEMU 473Y in SELinux domain 471Y, read only partition 475Z and KVM/QEMU 473Z in SELinux domain 471Z, read only partition 476X and KVM/QEMU 474X in SELinux domain 472X, read only partition 476Y and KVM/QEMU 474Y in SELinux domain 472Y, read only partition 476Z and KVM/QEMU 474Z in SELinux domain 472Z).

In the example of FIG. 4, the virtual devices are implemented as SEAndroid virtual devices. SEAndroid may provide benefits such as privileged daemon protection, application isolation, middleware controls, instrumentation and auditing, application install protection, limit application access to sensors, 'untrusted' application sandboxing, read-only core OS partition, centralized patching, and MDM/MAM controls.

In some embodiments, virtual devices can be migrated between device servers by administrative commands (via management network 450), using tools to automate the balancing of load across multiple device servers or based on geographical location.

Each of these virtual devices may be connected to a physical mobile device (e.g., smartphone 430, tablet 440, etc.). In some embodiments, a VC client application running on the physical device may be configured to provide remote two factor authentication, remote signing and decryption, TLS encryption for data in transit, GPS-based access policies, attributes exposed for MDM integration, mechanisms to improve attestation, and/or integration with the mobile device's Mobile Trusted Module (MTM).

When a user is added to a management domain, they are provisioned with a virtual device of a particular type. Similarly, when a user is removed, their virtual devices must be deactivated and their "parts" archived or reclaimed. A separate management server is used by administrators to manage the lifecycle of devices and users of a virtualization cloud (e.g., virtualization cloud 150, virtualization cloud 250, virtualization cloud 350, virtualization cloud 400, etc., collectively referred to hereinafter as the "VC system"). In some embodiments, provisioning services permit administrators to define device "types" (templates) and configurations and assign them to users depending upon the role or duty.

In some embodiment, the management of the VC system and the virtual devices can be controlled through a management policy system. Servers, storage, and virtual devices can be associated with hierarchically arranged policy containers. Policies and access to components can be controlled through these containers and their position in the hierarchy. In some embodiment, these policy containers may be referred to as policy domains and can be used to allocate and delegate control to multiple administration management domains.

For example, consider a hosted VC environment. A hosting partner wishes to support multiple enterprise customers in a single installation. At the same time, they would like to delegate much of the management to their customers. They may choose to create a single policy domain that contains shared resources such as common virtual device images, common device storage, and a shared pool of device servers. For each new customer, they create a sub-domain and grant administrative access to the customers' administrators for their respective sub-domain. In addition, they create a policy in the root domain that all resources are accessible to the sub-domains. The customers' administrators can now create assets (new device image templates, users, administrators, groups) within their own sub-domain. They, in turn, can create their own sub-domains and assign assets, users, groups, administrators, etc. to those sub-domains as well as policies to determine how resources can be inherited from the companies' sub-domain.

If one of these customers wants dedicated server resources to run the virtual devices or to maintain their storage, the hosting partner can add device server and storage server resources to their sub-domain(s) and thus only their virtual devices will be running or be saved on those server assets. Similarly, those systems might have different networking characteristics that would let them share a VPN connection to the enterprise as opposed to configuring a VPN within each of the virtual devices.

This organization can also be beneficial to enterprises that need to delegate management functions to different departments within their enterprise yet want to control and maintain the overall infrastructure centrally.

When migrating a user between two templates, the VC system can support intelligent upgrading, including:
Scheduling specific times for upgrades to occur.
Roll back to a previous device template if an error occurs.
Partial, incremental upgrade processes across a user population.
Detection of whether a user is active on a virtual device before enacting the upgrade.
Graceful shut down of a virtual device for which an upgrade is being forced.

As a non-limiting example, in some embodiment, a provisioning and management server for the virtual machine device servers described above can be built on top of a virtual datacenter management platform such as OVirt, OpenStack, or the like. OVirt and OpenStack are known to those skilled in the art and thus are not further described herein. OVirt provides the underlying data services for managing and accessing virtual machines. The VC system provides an abstraction interface that hides much of the complexity of the underlying virtual datacenter management platform when trying to manage multiple management domains within a single system. In some embodiments, SPICE may be integrated into the virtual datacenter management platform, allowing users to connect to virtual machines through SPICE.

In some embodiments, an administrator might want to allow users to access a mobile virtual device without a persist state of the virtual device beyond a given user's session. In this case, the virtual device may be deleted when the session ends. In some embodiments, the virtual device may optionally warn the user that the virtual device is operating on a kiosk mode when the user logs in, and delete the virtual device when the user logs out. Essentially, the kiosk mode provides a 'fresh' virtual device based on a specified template each time a user logs in.

In a variant of the kiosk mode, a virtual device can be set to synchronize certain enterprise data (e.g., recent email) when the user logs into the kiosk mode device, but the virtual device is still deleted when the user logs out. In this way, any new enterprise data is placed back into the enterprise applications that should own each respective data type. This allows the user to move between server node clusters (e.g., moving between countries) without concern about moving or synchronizing virtual device state between the different servers.

The VC system may support additional modes of operation. For instance, a published app mode may enable an organization to offer specific applications in remote 'containers' to large user populations. An example would be a bank using the published app mode to make an online banking application available to its customers, while hosting that online banking application in their own data centers on their own locked down OS image.

In such a published app mode, the end client application icon can be customized to enable white labeling. For example, when the user logs in, the published application is already open and in focus. When the user quits the application, the remote connection closes. In some embodiments, the published app mode can be coupled with the kiosk mode described above such so that the virtual device does not have a persist state.

In some embodiments, an organization may wish to provision a virtual device (whether a full device, kiosk mode, published app, etc.) to a person not employed by that organization, and the user need only download a VC client application or add the account to their existing VC client application on their mobile device(s).

In some embodiments, an organization may wish to provision one or more virtual devices to one or more employees at a partner organization. In this case, the publishing organization can liaise with the consuming organization to add a VC client application and/or set of authentication settings to the consuming organization. One of the advantages of this approach is that the publishing organization can leverage the user provisioning and authentication mechanisms of the consuming organization. For example, access to the VC client application can become a setting in the consuming organization's active directory, and users in the consuming organization must already have authenticated to the consuming organization in order to have access to the publishing organization's applications/virtual devices.

In this scenario, doing two remoting steps would add latency and complexity to the VC system. To avoid this, when the user connects to the publishing organization's virtual device, the VC client application on the user's physical device can connect to the publishing organization's VC servers via a bypass channel in the VC server of the consuming organization.

As described above, SPICE can create new "channels" for different remote services. Different types of data can be communicated between a mobile device running a VC client application and a virtual device running in the VC system via different SPICE channels. These SPICE channels are mapped to virtual input/output channels.

Figure 5:
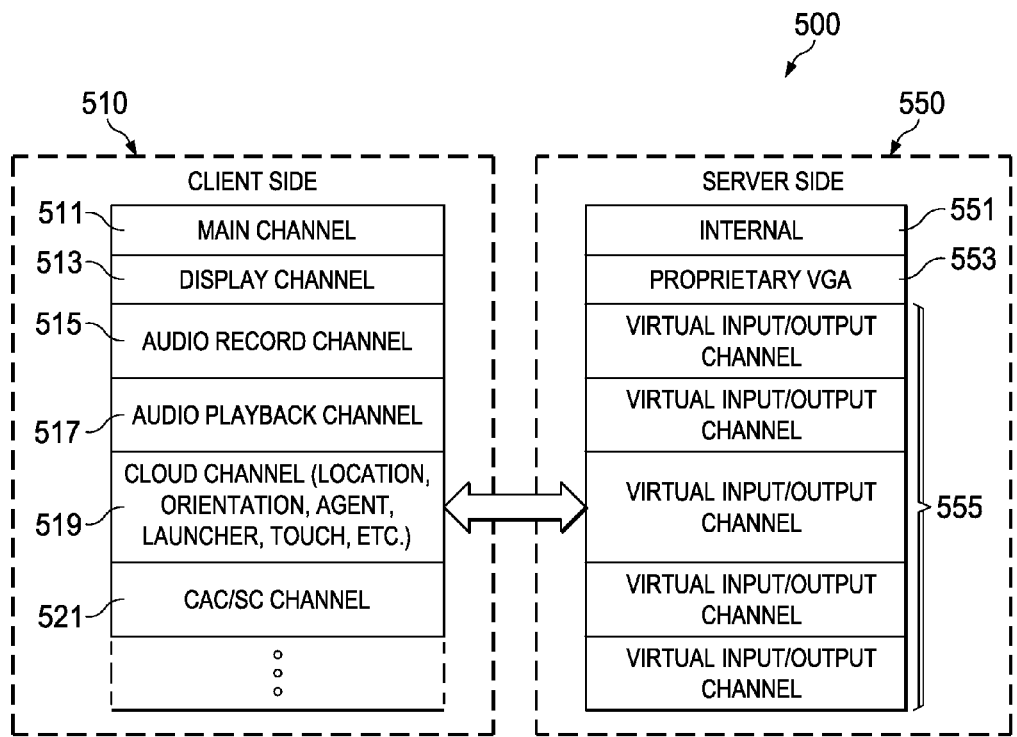
FIG. 5 depicts a diagrammatic representation of an example of a channel based device mapping architecture according to one embodiment.

FIG. 5 depicts a diagrammatic representation of an example of channel based device mapping architecture 500 according to one embodiment. In this example, data (e.g., display data, audio data, location data, etc.) may be communicated from a mobile device (e.g., client side 510) via various SPICE channels (e.g., main channel 511, display channel 513, audio record channel 515, audio playback channel 517, cloud channel 519, Call Admission Control (CAC)/Signaling Controller (SC) channel 521, etc.) to a server in the VC system (e.g., server side 550). Channel based device mapping architecture 500 may include a virtual device mapping module embodied on a non-transitory computer readable medium and configured for mapping the incoming data to appropriate virtual device component (e.g., internal component 551, proprietary video graphic adapter (VGA) 553, etc.) and/or virtual input/output channels 555, each associated with a particular virtual driver. This is further described below with reference to FIG. 6.

Figure 6:
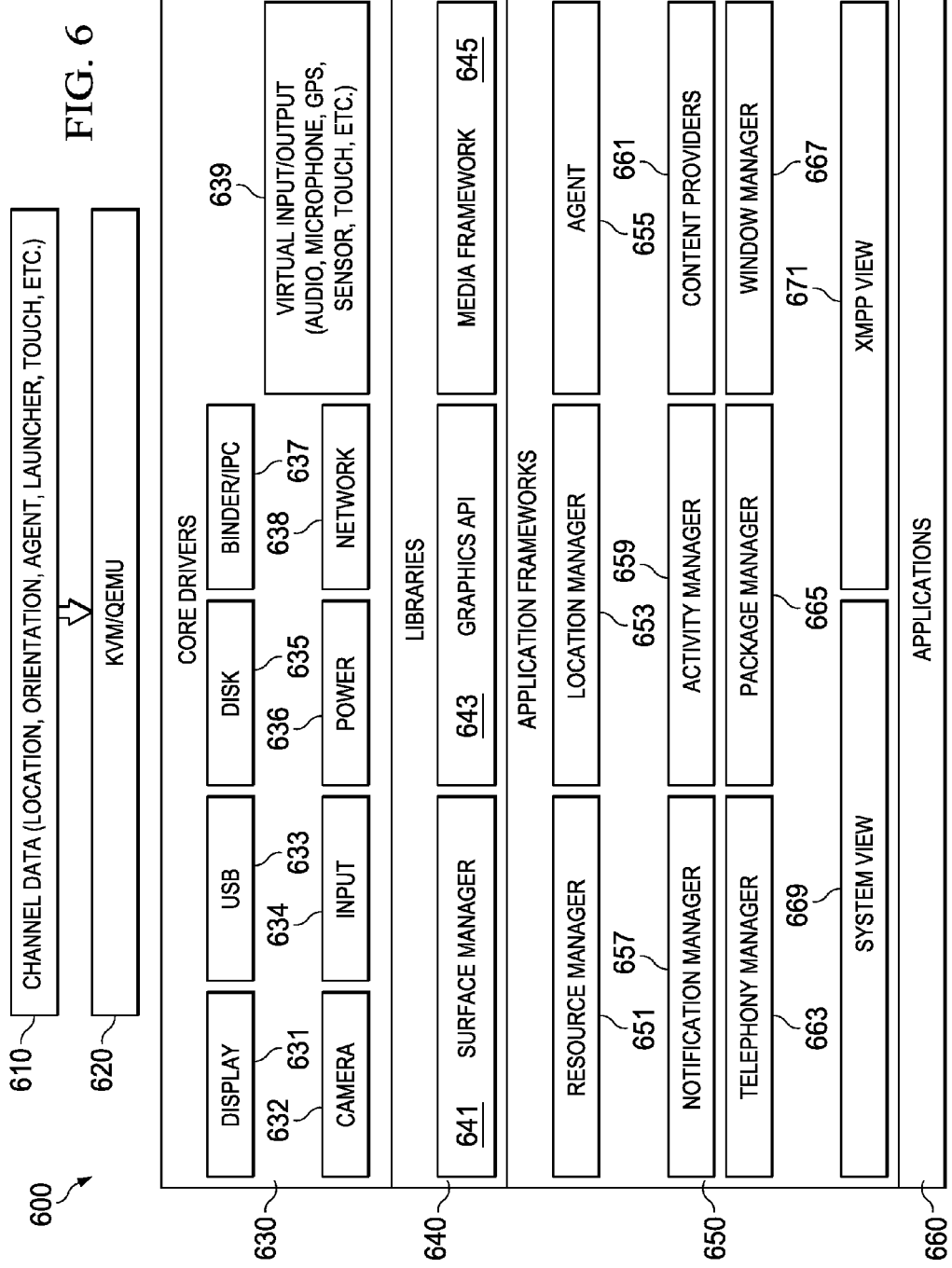
FIG. 6 depicts a diagrammatic representation of an example of virtualization server software architecture according to one embodiment.

FIG. 6 depicts a diagrammatic representation of an example of virtualization server software architecture according to one embodiment. As a non-limiting example, virtualization server software architecture 600 may implement a modified version of Android OS.

As illustrated in FIG. 6, virtualization server software architecture 600 may comprise a plurality of software components. At its core is a Linux kernel with specialized core drivers 630 to abstract the hardware layer from the application runtimes. Channel data 610 are received into a virtual device's KVM/QEMU 620, mapped via virtual input/output channels 639, and handled by corresponding virtual device drivers (e.g., display driver 631, universal serial bus (USB) driver 633, disk driver 635, binder/inter-process communication (IPC) driver 637, camera driver 632, input driver 634, power management 636, and network driver 638, etc.). These "virtual" device drivers replace the drivers for a real device and communicate using QEMU and the SPICE protocol with a VC client application executing on the mobile device for access to the real devices and the services they provide.

Virtualization server software architecture 600 may further comprise a collection of libraries for accessing data, working with text and graphics, encryption and communication, and the underlying OS. In the case of Android OS, each virtual device session includes a full complement of Android's application framework, libraries, runtime, and applications. However, some kernel-based services provided within a virtual device server are modified. For example, power management services are simulated and significantly altered as battery support is not an issue in a virtual device. User interface (UI) indicators for batteries and other elements not applicable to the virtual device can be made to reflect the values of the client device.

As another example, applications running in a virtual device do not use the local device's WiFi or data network. Instead, they use the Internet Protocol (IP)-based network services provided by the virtual device servers. In some embodiments, an "always-on" network interface may be provided to the applications. WiFi and data connectivity management applications the user may install in the virtual device may have no relevance.

Virtualization server software architecture 600 may include additional virtual drivers not shown in FIG. 6. Many of the virtual drivers may communicate with a VC client application running on a mobile device using extensions to the SPICE protocol. Some are designed to improve performance whereas others provide access to features expected in a mobile device. Some example virtual drivers are further described below.

Virtual sensors driver—provides access to the remote client's sensor devices such as the GPS, the gyroscope, the accelerometer, a compass, battery level, WiFi signal strength, and 3G/4G signal strength. Other sensor types can be added as needed.

When an application requests access to a sensor such as the GPS, the sensors driver sends a device message that results in a sensor request being sent to the remote client. The remote client application then makes a similar request to the physical device and begins forwarding sensor data back to the sensor driver as the sensor produces data. When the application no longer needs the sensor information, a close request is sent back to the client where it then stops monitoring the specified sensor.

Some sensors, such as the GPS, can draw significant battery power while running. To prevent unnecessary battery drain, the VC client application running on the physical mobile device can request that the GPS on the local mobile device be turned on or off based on the requirements of applications running on the virtual device in the VC system.

Some sensors such as the accelerometer may change values very frequently. The VC client application can be configured to sample and relay accelerometer values from the local physical device based on attributes and requirements of the app running on the virtual device in the VC system as well as the performance of the network connection between the local and virtual devices (higher network latency and lower available bandwidth result in fewer sensor values being communicated).

A specific example of this is in how the VC system synchronizes the orientation of the remote virtual device to the orientation of the local device by continually monitoring and relaying orientation change events on the accelerometer on the local device, while not relaying every minor rotation of the device all the time even if the application on the remote virtual device is not monitoring the accelerometer data.

Additional sensors that the VC system can remote from the local device to the virtual device may include the network type, network signal strength, battery charge remaining, light sensor (used for screen diming), Bluetooth, peripheral device connectivity and the state of any local payment credential.

Virtual touchscreen driver—supports remoting of multi-touch actions and also gestures. Multi-touch gestures can be used for zooming, rotating and other similar operations. In one embodiment, the SPICE mouse channel may be modified for this purpose. In some embodiments, a designated channel is used for this purpose.

Audio and video bypass driver—improves the performance of audio and video processing for both the VC server and the VC client. While embodiments can work without bypass, there is a CPU cost on both the client and the server when using the internal video processing of the host operating system (e.g., Android). To this end, modified media framework 645 is provided to replace audio and video players that came with the OS with special players that implement the bypass functions. For example, when an application requests to play a video using the Android video player (either full-screen or embedded), the bypass video player captures either the video data or an Universal Resource Locator (URL) that points to an address where the actual video file resides, and passes it via the bypass driver to the remote client. The client then spawns a local video player and plays the video stream. In the case of network video sources, the entire stream can be handled outside of the virtual device via a network proxy.

Audio bypass works much like video bypass. The audio player is replaced to provide proxy access to audio data in the client.

Virtual camera driver—remotes a camera using a combination of a virtual camera device driver and modifications to the camera functions in the media framework. When the camera activity or fragment is loaded in the virtual device, the modified camera viewer and virtual camera driver sends a request to the client to bring up the camera. Once a picture is taken, the picture or video is sent to the virtual device server where it can be placed in the flash storage of the virtual device or can be delivered to an anti-virus scanner and then placed in enterprise storage.

Virtual display driver—optimizes delivery of graphics to a remote client. More specifically, the graphics layer can be instrumented to generate messages via a virtual display driver instead of writing directly to a frame buffer. In some embodiments, surface manager 641 in libraries 640 is implemented to handle partial updates to the Android display. In some embodiments, surface manager 641 may work in conjunction with graphics API 643 to provide acceleration for various commands issued by applications and the Android OS.

These and other virtual drivers support remote access for applications 660 running on application frameworks 650 in the virtual device. Operation of the virtual device, including processes associated with applications 660, as well as user behaviors can be monitored via various components in application frameworks 650 (e.g., resource manager 651, location manger 653, agent 655, notification manager 657, activity manager 659, content providers 661, telephony manager 663, package manager 665, window manager 667, system view 669, Extensible Messaging and Presence Protocol (XMPP) communications service 671, etc.), some of which will be further described below.

When the client application executing on the physical mobile device is connected to the corresponding virtual device, notifications that occur in the virtual device can be handled by the notification manager of the virtual device, and can be provided directly to the physical device, where they are observable by the user. When this connection is broken, however, the notifications are no longer observable using the normal notification mechanism. It is therefore necessary to forward notifications to the client on the mobile device in order to alert the user to activity in the virtual device. This is not a trivial matter, though, as it is generally undesirable for security reasons to allow the data of a virtual device in a private network to be stored or maintained on the physical mobile device which is outside the private network. The notifications must therefore be handled in a manner which ensures the security of confidential data as determined by applicable policies.

As noted above, embodiments of the invention may include mechanisms to enable notifications that are originated by applications executing on a virtual device to be provided to a physical mobile device that is disconnected from the virtual device. In one embodiment, a notification server is provided in order to implement a publisher/subscriber model for delivering notifications from producers to consumers. In the context of the systems described above for hosting virtual devices, the virtual device is the publisher and the corresponding physical device is the subscriber. The physical device can subscribe to multiple types of notifications or other events, possibly even from multiple virtual devices. It should be noted that this model can be used to deliver notifications and information regarding other noteworthy events from various virtual devices or services within these devices to other types of clients as well, such as management tools, infrastructure monitoring services, or security services.

Figure 7:
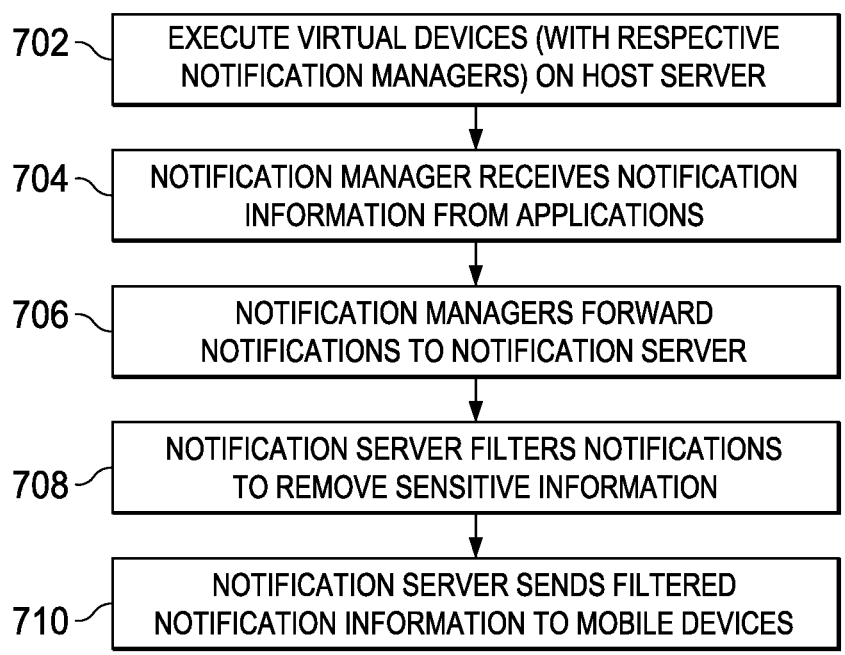
FIG. 7 depicts a flow diagram illustrating an exemplary embodiment of a method for communicating notification information to a physical device that is disconnected from a corresponding virtual device executing on a private network.

Referring to FIG. 7, a flow diagram illustrating one embodiment of a method for providing notifications in such a scenario is shown. In this embodiment, one or more virtual devices are executed on a host server (702). The host server provides a private network environment that is secure and requires authorization in order to allow physical mobile devices to access the network. On each of these virtual devices, a notification manager is executed. The notification manager executing on each of the virtual devices receives notification information from various applications that are also executing on the virtual device (704). The notification information is forwarded to a notification server (706), where it is stored until a client mobile device can connect to the server. After the client mobile device connects to the event server, the notification information is filtered according to applicable rules in order to remove sensitive information (e.g., confidential, proprietary, or other defined types of secure information) that is not authorized to be communicated out of the private network (708). The particular type of filtering that is applied to the notification information (and the type of information that is filtered out of the notifications) is determined in response to the client mobile device connecting to the server, and may be dependent upon a number of factors, such as the identity of the mobile device's user and the location from which the private network is being accessed. After the sensitive information has been filtered out of the notifications, all or part of the notifications may be communicated to the mobile device (710).

Figure 8:
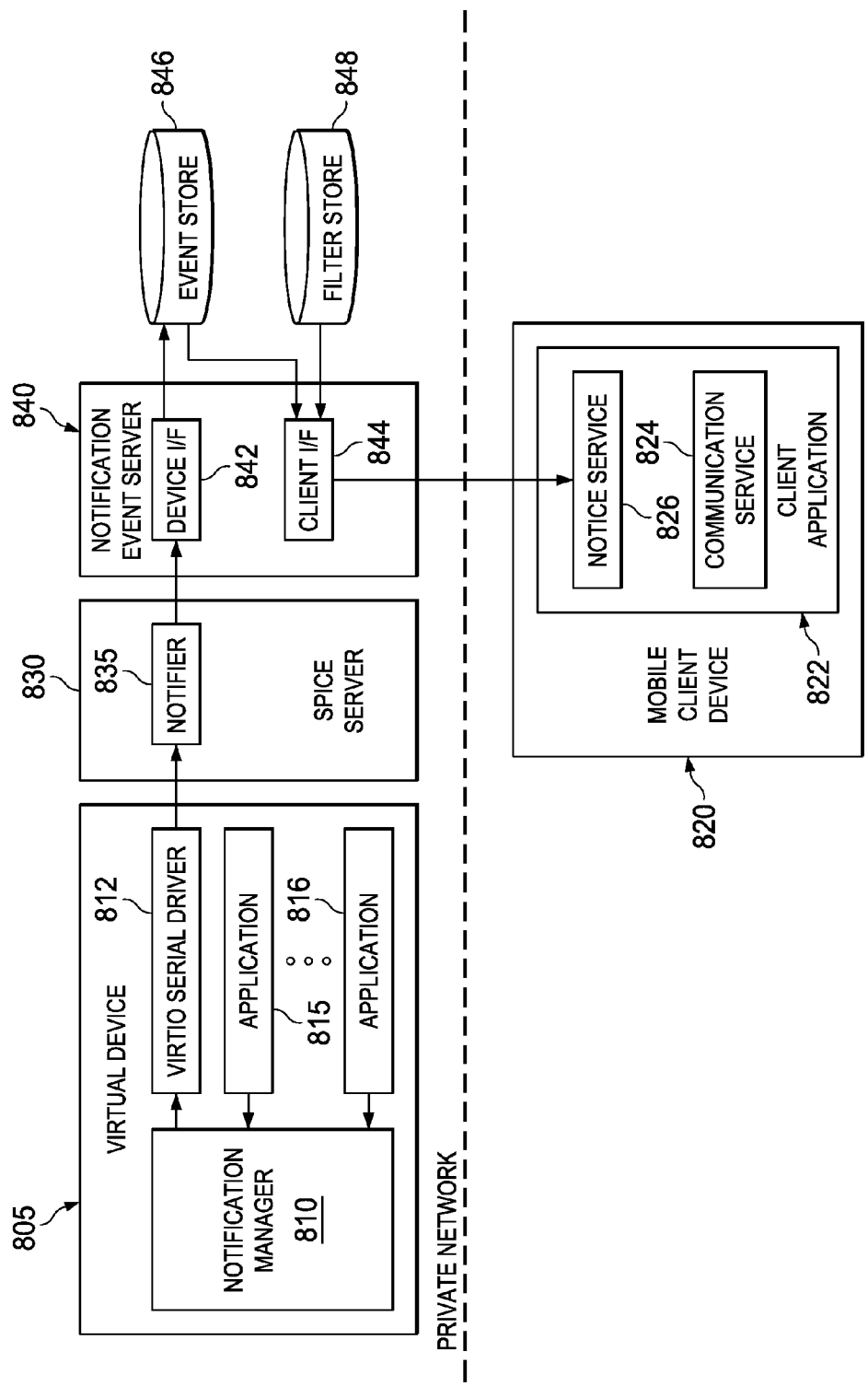
FIG. 8 depicts a diagrammatic representation of an exemplary system for communicating notification information to a physical device that is disconnected from a corresponding virtual device executing on a private network in one embodiment.

Referring to FIG. 8, a functional block diagram illustrating the components of an exemplary system in which this method may be implemented is shown. As described above, a virtual device 805 is instantiated on a host server. The host server is part of a computer system that operates within a private network 802. Virtual device 805 is instantiated by the host server to perform functions that simulate the activity of a physical mobile device 820. Although virtual device 805 is typically instantiated while physical device 820 is connected to private network 802, the physical device may become disconnected, either intentionally or unintentionally, from the private network. Typically, virtual device 805 continues to execute and perform the functions of physical mobile device 820, even when the physical device is disconnected from the virtual device and the private network.

If physical mobile device 820 is connected to virtual device 805, it will be assumed for the purposes of this discussion that the mobile device, or the user of the mobile device, has provided any required tokens, passwords or other information necessary to authenticate the user and the device. It is therefore assumed that a secure channel of communication has been established between the physical device and the virtual device. In this case, if applications 815-816 require any notifications to be provided to the user, notification manager 810 will provide these notifications directly to the physical device in essentially the same manner they would be provided if the notification manager were executing on the physical device itself. The notifications may also be originated by other types of notification sources, such as email servers that are external to the virtual device.

The term "authorization token" is used herein to refer to any such information that is used to authenticate either a device or a user to a private network. It should also be noted that the term user may be used to refer to a person using a physical device to access the private network, or to the device itself when discussing the authentication of the user to the system.

If, on the other hand, physical mobile device 820 is not connected to and actively using virtual device 805, the mobile device does not have access to the notification information. Consequently, it is necessary to provide an alternate means of communicating notifications to the physical device, since the user expects the physical device to provide these notifications in the same manner as a physical device on which the notification manager and applications are executing locally. Notification event server 840 is therefore employed in this embodiment to provide a mechanism to filter and deliver notification information to the mobile device, while maintaining data security in accordance with applicable policies. It should be noted that, while notification event server 840 is depicted as a separate server in this embodiment, alternative embodiments may provide the functionality disclosed herein in systems having different topologies, different allocations of functions between the system components, or other variations from the described exemplary embodiments.

In this embodiment, virtual device 805 utilizes virtual I/O driver 812 to provide the notifications to a notifier module 835 on a SPICE server 830. These notifications are essentially the same notifications that would be provided by a notification executing on a physical device. For example, in the case of email notifications, the notifications may include a sender of the email, a subject line, or even a preview of the email itself. Notifier module 835 forwards this information to a notification server 840 via device interface 842. Notification server 840 then stores the received information for each notification event in an event store 846. The event store may comprise any suitable means for storing the notification events. SPICE server 830, notification server 840 and event store 846 are within private network 802, so any information contained within the notifications remains secure within the private network to this point.

Notification server 840 is configured to "scrub" or "sanitize" the notification information that is received from virtual device 805 (via spice server 830), and to provide notifications to the user (via physical mobile device 820) that do not contain sensitive information that is intended to be retained within private network 802. Notification server 840 accomplishes this by selecting appropriate filters from filter store 848 based on information associated with the physical device connected to the event server, applying these filters to the notifications in event store 846 and providing the resulting notification information to the physical device via client interface 844. In one embodiment, physical mobile device 820 executes a client application 822 which includes a notification service 826. The notification service is configured to execute a special service thread that pulls notifications from client interface 844 of the notification server. Physical device 820 must authenticate itself to notification server 840 to ensure that notification service 826 can pull the notifications that are associated with the physical device, and with virtual device 805. The scrubbing occurs after the physical device connects and authenticates.

The embodiment of FIG. 8 utilizes a separate server to filter and deliver notifications and event information to the physical device in order to facilitate interactions with devices that may or may not be connected to the private network. The centralization of the notifications and event information in this server may also make this information more manageable and accessible. This configuration enables the use of a centralized interface that eliminates the need for a management tool that has to separately connect to every virtual device to capture notification and event information. Additionally, since some event information is not generated by the virtual device itself, this information can bypass the virtual device entirely, making the system more efficient. For example, a "BIFF"-type email monitoring service can be implemented to notify the user (via the physical device) that new emails are available, even when the virtual device is not executing.

Notification server 840 may be implemented using any of a variety of currently available types of servers. For example, the notification server could consist of a messaging server such as Apache Kafka, which is highly scalable, easily clustered, geographically replicable, and has persistent storage.

Alternatively, a simple Java-based Q server such as Kestrel, a fast and lightweight JMS server such as HornetQ, or an open source server such as RabbitMQ (which is included in OpenStack) could be used. As another alternative, a websocket communications interface could be utilized. This interface would easily work over any firewall or proxy server, and could leverage a publisher/subscriber framework such as WAMP, JMS, STOMP (text-based messaging protocol), etc. It should be noted that if websockets are used as clients to be able to communicate with a messaging server, it might be necessary to implement a websocket proxy to which the client maintains a persistent websocket connection on the serverside. This proxy would package client events using a serverside protocol and would send server-side events to the clientside. In one embodiment, websocket "channels" are used for communication. These channels internally map to "topics" on the message server.

Figure 9:
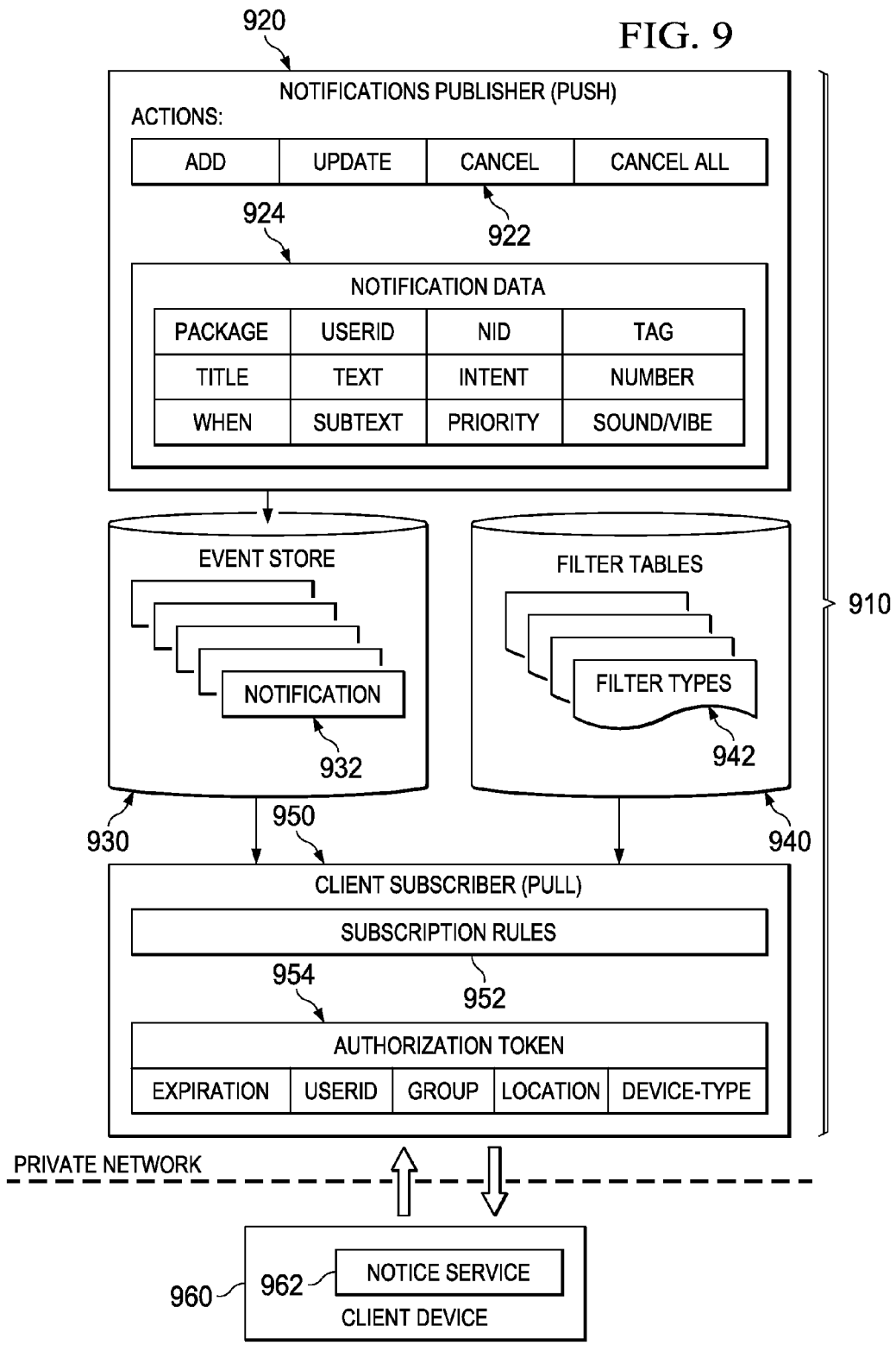
FIG. 9 depicts a diagrammatic representation of the relationship of components within the notification server in one embodiment.

Referring to FIG. 9, a diagram illustrating the relationship of components within the notification server is shown. In this embodiment, the notification server includes a notifications publisher 920, an event store 930, a filter store 940, and a client subscriber 950. Notifications publisher 920 may perform various actions 922 with respect to the notifications it receives. For example, it may add new notifications to event store 930, it may update these notifications, or it may cancel one or all of the notifications. Notifications publisher 920 may store various different types of notification data 924 associated with each of the notifications. Notification data 924 may include, for example, an identifier (user ID) of a user with which the notification is associated, an identifier for the notification (NID), a time (when) associated with the notification, the text of the notification (text), and so on. The particular types of notification data that are supported by the system may vary from one embodiment to another. Further, each particular notification may include data entries associated with one, multiple, or all of the different supported data types.

Event store 930 may be a database or some other type of data structure that is suitable for storing the notification data. The notifications (e.g., 932) are added to event store 930 by notifications publisher 920. In this embodiment, the notifications are maintained in event store 930 until they are canceled (e.g., by notifications publisher 920). In some embodiments, the notifications may be canceled or updated as a result of user interactions with applications on the virtual machine, expiration of time limits associated with the notifications, or other events. The notifications in event store 930 can be updated by notifications publisher 920 to modify one or more of the notification data entries for the respective notifications.

The notifications (e.g., 932) in event store 930 can be retrieved by client subscriber 950. Client subscriber 950 retrieves the notifications in response to receiving a request from client device 960. A notice service 962 executing on the client device transmits an authorization token to client subscriber 950. The authorization token (954) includes several data items that are associated with client device 960, such as a user ID, a group identifier, a device-type identifier, a location (e.g., GPS coordinates) of the device, and various other administrative information.

Data items such as the user ID and group identifier are used by client subscriber 950 to determine who the client device is associated with and, consequently, which of the notifications should be retrieved from event store 930. Once the notifications are retrieved from event store 930, they will need to be processed by one or more of the filters (e.g., 942) that are maintained in filter store 940. The selection of appropriate filters may be based on one or more of the data items from the authorization token, including the user ID, group identifier, location, and device type. Client subscriber 950 processes the retrieved notifications using the selected filters to produce notification information that can be transmitted from the client subscriber (which lies within a private domain) back to the client device (which is outside the private domain) without allowing sensitive information to escape the private network. "Sensitive" is used here to describe information that an administrator does not wish to have communicated beyond the boundaries of the private network. The definition of sensitive information may therefore vary from one system to another and is set by the administrators of the respective systems.

Figure 10:
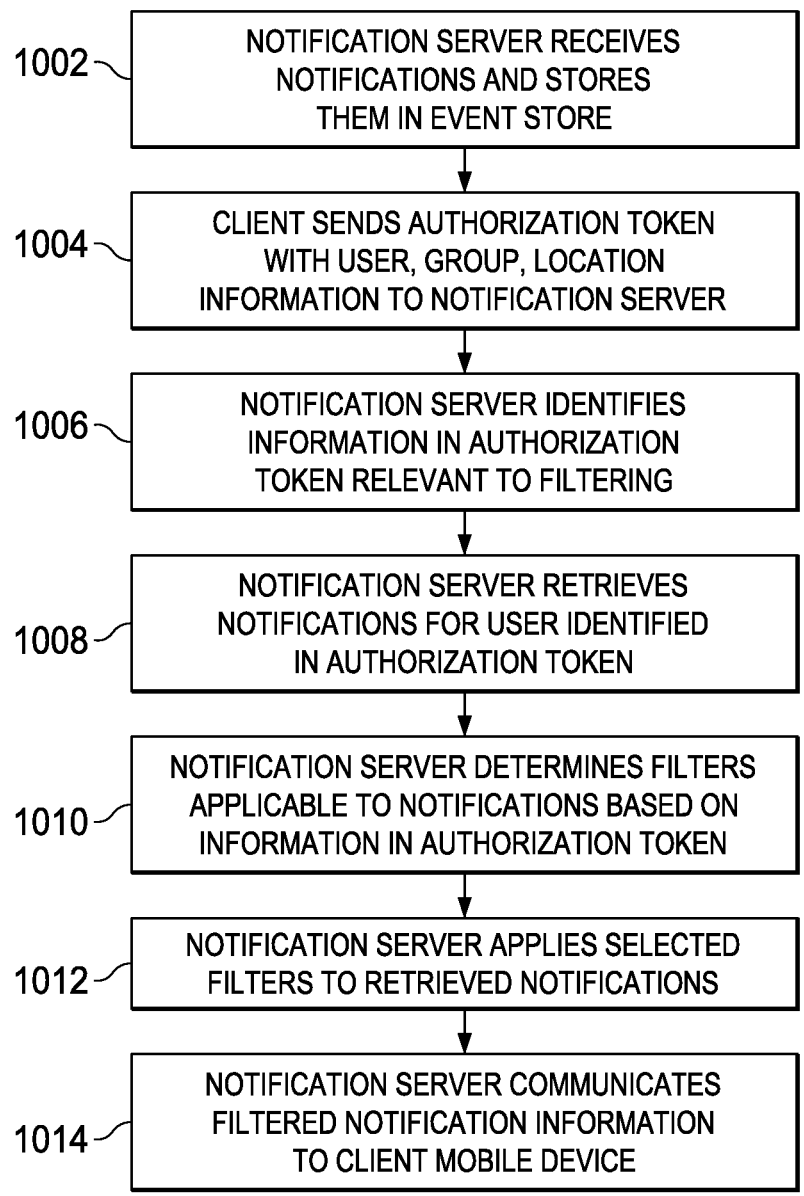
FIG. 10 depicts a flow diagram illustrating operation of a notification event server in an exemplary embodiment.

The operation of the notification server in this embodiment is summarized in the flow diagram of FIG. 10. As shown in this figure, the notification server initially receives notifications and stores the notifications in the event store (1002). The notification server continues to receive notifications, store the notifications and manage the notifications in the event store while the remainder of the steps in the process of FIG. 10 are performed. At step 1004, a client sends an authorization token to the notification server. The notification server identifies information contained in the authorization token which is relevant to the identification of notifications associated with the client and to the filtering of these notifications (1006). Based on the information identified in the authorization token, the notification server identifies the user associated with the token and retrieves notifications from the event store that are associated with the user (1008). The notification server also determines which filters are applicable to the identified client based on information contained in the token (1010). The notification server then applies the selected filters to the retrieved notifications to produce a sanitized notification output that does not contain sensitive information (1012). The sanitized notification output is then transmitted to the client device, where it can be displayed to the user of the device (1014).

The filters, or filter types, that are used to sanitize the notification information may, for example, be simple rules or statements about what data is included in the sanitized notifications that are sent to the client. For example, a filter can specify whether the user can see the title, text, subject, date/time, priority, etc. that are associated with the original notification. In one embodiment, a filter can be thought of as a series of Boolean values that specify whether corresponding data items in the notification are forwarded to the client, or are removed from the notification before it is delivered to the client. Other types of filtering may be used as well. For instance, a "dirty word" filter may be implemented to replace specified "dirty" words with alternative terms, or to remove the "dirty" words altogether. The filters can be implemented in a variety of ways. In one embodiment, the filtering criteria consists of two parts. The first part is the identification of the user, the user's group membership(s), and the user's location, so that the system can determine which notifications should be filtered and delivered to the client device. The second part is the application of rules that are set up by administrators to define what data is filtered out of the notifications and what data is actually delivered to the client. These rules may also cause new information to be generated, rather than simply filtering out information. For example, rather than providing any specific information from a set of received emails, voicemails or text messages, the notification server may simply provide an indication of the number of received messages.

Referring to FIGS. 11 and 12, a pair of tables illustrating the implementation of notification filtering in one embodiment are shown. FIG. 11 is a table showing which filters are used, depending upon the user ID, group and location associated with the client device. FIG. 12 is a table showing the data items that are allowed and/or filtered out of notifications for each of a set of filter types. It should be noted that the tables illustrated in these figures are exemplary, and other tables or entirely different types of data structures may be used to identify the filters that are appropriately applied for a particular client device.

Referring to FIG. 11, the leftmost column of the table identifies various users and groups that may be associated with the client device. The top row of the table identifies several location constraints for the client device. Depending upon the user ID, group and location that are identified for a client, a particular entry in the table is selected and the filter identified in that entry is used to filter notifications for the client. For example, if the user is identified as Jane Jones and the client is within 100 m of the coordinates {40.6895, 74.04478}, then the "B" filter should be used. When the filter has been identified, the information that is retained/removed is determined from the table of FIG. 12. In this example, when filter "B" is applied to notifications, data items "title", "when", "sound", "number", "priority", "vibrate", and "what" will be retained for each of the notifications transmitted to the client, while "text" and "subtext" will be removed from the notifications.

Figure 13A:
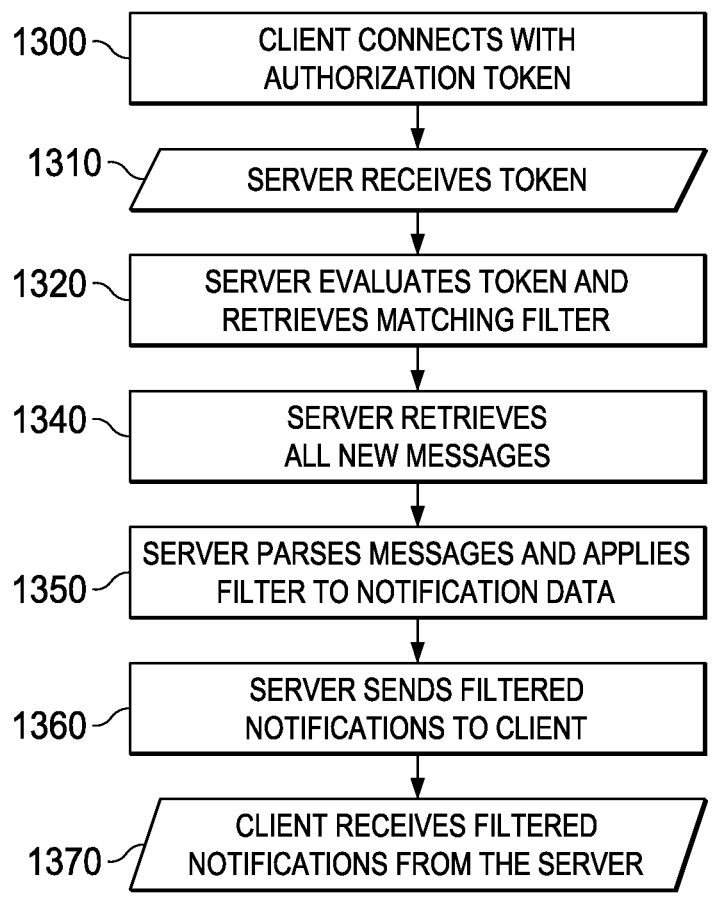
FIGS. 13A and 13B depict flow diagrams illustrating an exemplary method for filtering notifications in one embodiment.
Figure 13B:
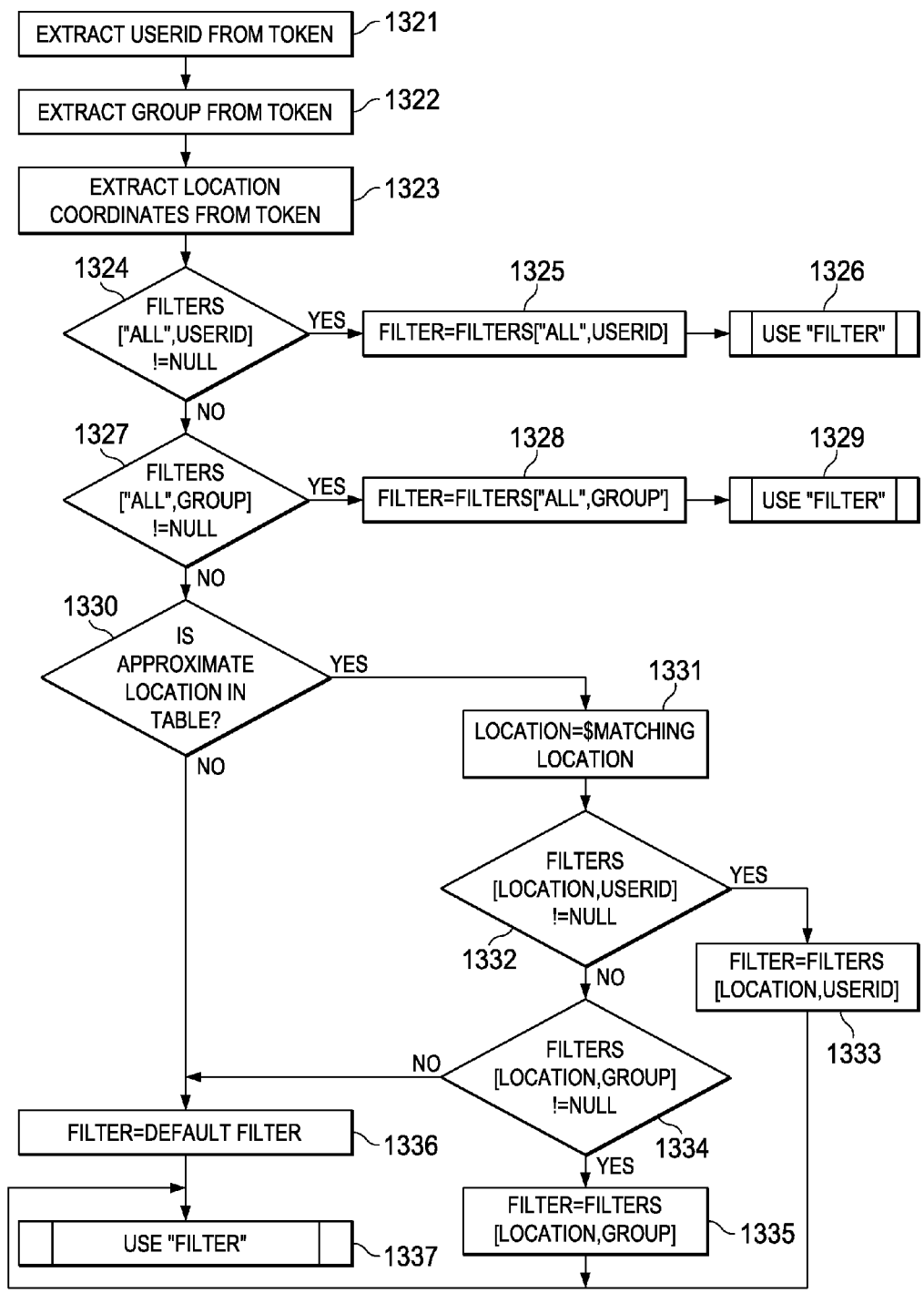

Referring to FIGS. 13A and 13B, a pair of flow diagrams illustrating an exemplary method for filtering notifications in accordance with one embodiment is shown. FIG. 13A depicts, at a high level, a method beginning with the client transmitting an authorization token to the notification server and ending with receipt of filtered notifications at the client. FIG. 13B depicts in more detail the portion of the method in which an authorization token is evaluated and an appropriate filter is retrieved.

Referring to FIG. 13A, the method begins with a client sending an authorization token to the notification server (1300). The authorization token is received at the notification server (1310), which evaluates the token and retrieves a filter that is appropriate for the client (1320). Step 1320 for evaluating the token and retrieving the filter is shown in more detail in the flow diagram of FIG. 13B, which will be described in more detail below. After the appropriate filter has been retrieved, the notification server retrieves all new messages for the client (1340). The notification server parses these notifications to identify their different component items (e.g., title, text, etc.) and applies the appropriate filter to the notifications (1350). The notification server then sends the filtered notifications to the client (1360). The client receives these filtered notifications from the server and presents them to the user (1370).

As noted above, the evaluation of the authorization token and retrieval of the appropriate filter (step 1320) is illustrated in more detail in FIG. 13B. This portion of the method (steps 1321-1337) makes use of the tables shown in FIGS. 11 and 12. The evaluation of the authorization token begins with extraction of the user ID, group and location from the authorization token (1321-1323). The notification server first checks to see if, for the user ID identified in the token, there is an entry in the filter table in the column having the heading "all" (1324), which refers to all locations. If so, this indicates that, for all locations, the identified filter is applicable for this particular user. The notification server therefore selects the filter identified in the corresponding entry of the table (1325) and retrieves the selected filter from the filter store (1326).

If, at step 1324, it is determined that the table of FIG. 11 does not contain an "all" location entry corresponding to the identified user ID, the notification server determines whether, for the group identified in the authorization token, there is an entry in the "all" column of the filter table (1327). If there is an "all" entry for the identified group in the table, the filter identified in this entry is selected (1328), and the filter is retrieved from the store (1329).

If neither the user ID nor the group identified in the authorization token is a corresponding entry in the "all" location column of the table of FIG. 11, the notification server determines whether the location of the client device identified in the authorization token proximately matches one of the locations identified in the table (1330). If not, the notification server selects a default filter (1336) and retrieves this filter from the store (1337) to be used in the processing of the notifications. If, on the other hand, the location of the client device which is one of the entries in the table, the corresponding column in the table is selected (1331).

The notification server then determines whether there is filter identified in the entry at the row of the user ID and column of the identified location (1332). If this entry identifies a filter, this filter is selected (1333), and the selected filter is retrieved from the filter store (1337). If, at step 1332, there is no filter identified at the entry corresponding to the location and user ID of the authorization token, the notification server determines whether filter is identified in the entry corresponding to the location and group (rather than user ID) of the authorization token (1334). If a filter is identified in this entry of the table, this filter is selected (1333), and the selected filter is retrieved from the filter store (1337). If, on the other hand, no filter is identified in the entry corresponding to the location and group, the notification server selects a default filter (1336) and retrieves this default filter from the filter store (1337).

It should be noted that the particular method by which filters are selected may vary from one embodiment of the invention to another. The flow diagrams of FIGS. 12 and 13 illustrate only one of the many methods that may be implemented select an appropriate filter. Other embodiments may use other steps. Similarly while only a single filter is selected by the method of FIGS. 12 and 13, other embodiments may select additional filters. Still further, alternative embodiments may use information other than that used in FIG. 12 (i.e., user ID, group and location) to identify appropriate filters.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A system for providing notifications from virtual devices to users of corresponding physical devices, the system comprising:
   a host server executing a virtual device, wherein the virtual device includes a notification manager that receives notifications from one or more notification sources; and
   a notification server coupled to the host server, wherein the notification server receives the notifications from the notification manager and stores the notifications in an event store;
   wherein the notification server receives authentication information from a physical device that is disconnected from the virtual device and identifies a user based on the authentication information;
   wherein the notification server identifies one or more of the notifications in the event store that are associated with the identified user and retrieves the identified one or more of the notifications from the event store;
   wherein the notification server selects one or more filters from a filter store based on the identified user, one or more groups associated with the user, a location associated with the user, or a combination thereof;
   wherein the notification server applies the selected one or more filters to the retrieved one or more notifications to produce filtered notification information, wherein the filtered notification information excludes at least a portion of the information contained in the retrieved notifications; and
   wherein the notification server provides all or part of the filtered notification information to the physical device.

2. The system of claim 1, wherein the notification server stores the notifications in the event store when the physical device is not connected to or actively using the virtual device.

3. The system of claim 1, wherein the notification server provides all or part of the filtered notification information to the physical device by allowing a service executing on the physical device to pull all or part of the filtered notification information from an interface of the notification server.

4. The system of claim 1, wherein the one or more notification sources comprise one or more applications executing on the virtual device.

5. The system of claim 1, wherein the notification server is configured to receive notifications from one or more server machines external to the host server, the one or more server machines sending the notifications to the notification server independently of the virtual device.

6. The system of claim 1, wherein the authentication information comprises an authorization token for authenticating either the physical device or a person using the physical device.

7. The system of claim 1, wherein the virtual device is one of a plurality of virtual devices executing on the host server for the physical device and wherein each of the plurality of virtual devices includes a notification manager that receives notifications from one or more notification sources.

8. A method for providing notifications from virtual devices to users of corresponding physical devices, the method comprising:
   receiving by a notification server notifications from a virtual device executing on a host server;
   the notification server storing the notifications in an event store;

subsequent to receiving authentication information from a physical device, the notification server performing:
- identifying a user based at least on the authentication information;
- identifying and retrieving one or more of the notifications from the event store that are associated with the identified user;
- selecting one or more filters from a filter store based on the identified user, one or more groups associated with the user, a location associated with the user, or a combination thereof;
- applying the selected one or more filters to the retrieved one or more notifications to produce filtered notification information, wherein the filtered notification information excludes at least a portion of the information contained in the retrieved one or more notifications; and
- providing all or part of the filtered notification information to the physical device.

9. The method according to claim 8, wherein the notification server stores the notifications in the event store when the physical device is not connected to or actively using the virtual device.

10. The method according to claim 8, further comprising: receiving notifications from one or more notification sources.

11. The method according to claim 10, wherein the one or more notification sources comprise one or more applications executing on the virtual device.

12. The method according to claim 10, wherein the one or more notification sources comprise one or more server machines external to the host server, the one or more server machines sending the notifications to the notification server independently of the virtual device.

13. The method according to claim 8, wherein the authentication information comprises an authorization token for authenticating either the physical device or a person using the physical device.

14. The method according to claim 8, wherein the virtual device is one of a plurality of virtual devices executing on the host server for the physical device and wherein each of the plurality of virtual devices receives notifications from one or more notification sources.

15. A computer program product comprising at least one non-transitory computer readable medium storing instructions translatable by a notification server having at least one processor to perform:
- receiving notifications from a virtual device executing on a host server;
- storing the notifications in an event store;
- subsequent to receiving authentication information from a physical device:
  - identifying a user based at least on the authentication information;
  - identifying and retrieving one or more of the notifications from the event store that are associated with the identified user;
  - selecting one or more filters from a filter store based on the identified user, one or more groups associated with the user, a location associated with the user, or a combination thereof;
  - applying the selected one or more filters to the retrieved one or more notifications to produce filtered notification information, wherein the filtered notification information excludes at least a portion of the information contained in the retrieved one or more notifications; and
  - providing all or part of the filtered notification information to the physical device.

16. The computer program product comprising at least one non-transitory computer readable medium of claim 15, wherein the notification server stores the notifications in the event store when the physical device is not connected to or actively using the virtual device.

17. The computer program product comprising at least one non-transitory computer readable medium of claim 15, wherein the notifications are from one or more applications executing on the virtual device.

18. The computer program product comprising at least one non-transitory computer readable medium of claim 15, wherein the notifications are from one or more server machines external to the host server, the one or more server machines sending the notifications to the notification server independently of the virtual device.

19. The computer program product comprising at least one non-transitory computer readable medium of claim 15, wherein the authentication information comprises an authorization token for authenticating either the physical device or a person using the physical device.

20. The computer program product comprising at least one non-transitory computer readable medium of claim 15, wherein the virtual device is one of a plurality of virtual devices executing on the host server for the physical device and wherein each of the plurality of virtual devices receives notifications from one or more notification sources.

* * * * *